United States Patent
Cietwierkowski et al.

(10) Patent No.: US 10,489,506 B2
(45) Date of Patent: Nov. 26, 2019

(54) MESSAGE CORRECTION AND UPDATING SYSTEM AND METHOD, AND ASSOCIATED USER INTERFACE OPERATION

(71) Applicant: BlackBerry Limited, Waterloo (CA)

(72) Inventors: Marcin Cietwierkowski, Kitchener (CA); Nazih Almalki, Waterloo (CA); Robert George Oliver, Waterloo (CA); Zhe Chen, Kitchener (CA); Andrew Michael Inwood, Kitchener (CA)

(73) Assignee: BlackBerry Limited, Waterloo (CA)

( * ) Notice: Subject to any disclaimer, the term of this patent is extended or adjusted under 35 U.S.C. 154(b) by 113 days.

(21) Appl. No.: 15/160,582

(22) Filed: May 20, 2016

(65) Prior Publication Data
US 2017/0337176 A1    Nov. 23, 2017

(51) Int. Cl.
*G06F 17/00* (2019.01)
*G06F 17/27* (2006.01)
(Continued)

(52) U.S. Cl.
CPC .......... *G06F 17/273* (2013.01); *G06F 3/0482* (2013.01); *G06F 3/0485* (2013.01);
(Continued)

(58) Field of Classification Search
CPC ................ G06F 17/273; G06F 17/24
See application file for complete search history.

(56) References Cited

U.S. PATENT DOCUMENTS 5,870,548 A    2/1999  Nielsen
5,909,667 A    6/1999  Leontiades et al.
(Continued)

FOREIGN PATENT DOCUMENTS

EP    2797009 A1    10/2014

OTHER PUBLICATIONS

How to Find and Replace Text in Microsoft Word for Android, by Attila Szasz, published on Oct. 7, 2015, retrieved from https://www.digitalcitizen.life/how-find-and-replace-text-microsoft-word-android Digital.*
(Continued)

*Primary Examiner* — Scott T Baderman
*Assistant Examiner* — Barbara M Level
(74) *Attorney, Agent, or Firm* — Jenna L. Wilson; Wilson Lue LLP

(57) ABSTRACT

Message corrections are effected on a user electronic device using a touch-based user interface. In response to user input in a messaging application input field indicating that a replacement or correction operation is to be carried out, the device identifies multiple strings corresponding to the correction in at least one previous message sent by the messaging application. These strings are presented in context in a user interface in a visually distinguished manner, such as highlighting. The strings may be presented with replacement text. The user then confirms which strings are to be corrected by touch input at the location of the string in the user interface. In response to the touch input, the previous message is updated with the desired changes. The updated message can then be sent to a recipient. The user interface can be used in find and replace or spellcheck operations in an editing or composition application.

16 Claims, 16 Drawing Sheets

(51) Int. Cl.
*G06F 3/0481* (2013.01)
*G06F 3/0482* (2013.01)
*G06F 3/0484* (2013.01)
*G06F 3/0485* (2013.01)
*G06F 3/0488* (2013.01)
*G06F 17/24* (2006.01)
*H04W 4/12* (2009.01)

(52) U.S. Cl.
CPC ...... *G06F 3/04817* (2013.01); *G06F 3/04842* (2013.01); *G06F 3/04883* (2013.01); *G06F 17/24* (2013.01); *G06F 17/274* (2013.01); *G06F 17/276* (2013.01); *H04W 4/12* (2013.01)

(56) References Cited

U.S. PATENT DOCUMENTS

| | | | |
|---|---|---|---|
| 6,782,510 | B1 | 8/2004 | Gross et al. |
| 7,305,627 | B2 | 12/2007 | Tannenbaum |
| 7,428,702 | B1 | 9/2008 | Cervantes et al. |
| 7,734,702 | B2 | 6/2010 | Kim |
| 9,246,857 | B2 * | 1/2016 | Moisa .................. G06T 11/001 |
| 10,009,304 | B2 * | 6/2018 | Moisa .................. G06T 11/001 |
| 10,063,498 | B2 * | 8/2018 | Lee ........................ H04L 51/04 |
| 2002/0129053 | A1 * | 9/2002 | Chan .................... G06F 17/246 |
| | | | 715/213 |
| 2002/0194278 | A1 | 12/2002 | Golan |
| 2004/0162877 | A1 | 8/2004 | Van Dok et al. |
| 2005/0275662 | A1 * | 12/2005 | DiStefano, III ...... G06F 17/212 |
| | | | 345/619 |
| 2005/0278413 | A1 | 12/2005 | Tannenbaum |
| 2005/0283726 | A1 * | 12/2005 | Lunati .................. G06F 17/273 |
| | | | 715/257 |
| 2006/0149825 | A1 | 7/2006 | Kim |
| 2009/0216849 | A1 | 8/2009 | Vincent |
| 2010/0241700 | A1 | 9/2010 | Rasmussen et al. |
| 2010/0241749 | A1 | 9/2010 | Rasmussen et al. |
| 2011/0047222 | A1 | 2/2011 | Farrell et al. |
| 2012/0284601 | A1 | 11/2012 | Chan et al. |
| 2014/0317495 | A1 | 10/2014 | Lau et al. |

OTHER PUBLICATIONS

Javatpoint, Java String replace, retrieved from https://www.javatpoint.com/java-string-replace, archive May 2, 2016, 3 pages.*
Extended European Search Report dated Oct. 10, 2017 from EP17171919, 9 pgs.
Anonymous: "Why does Skype allow editing sent chat messages?—Quora", Feb. 15, 2011, XP55410888, Retrieved from the Internet: URL: https://www.quora.com/Why-does-Skype-allow-editing-sent-chat-messages (retrieved on Sep. 28, 2017, 2 pgs.

* cited by examiner

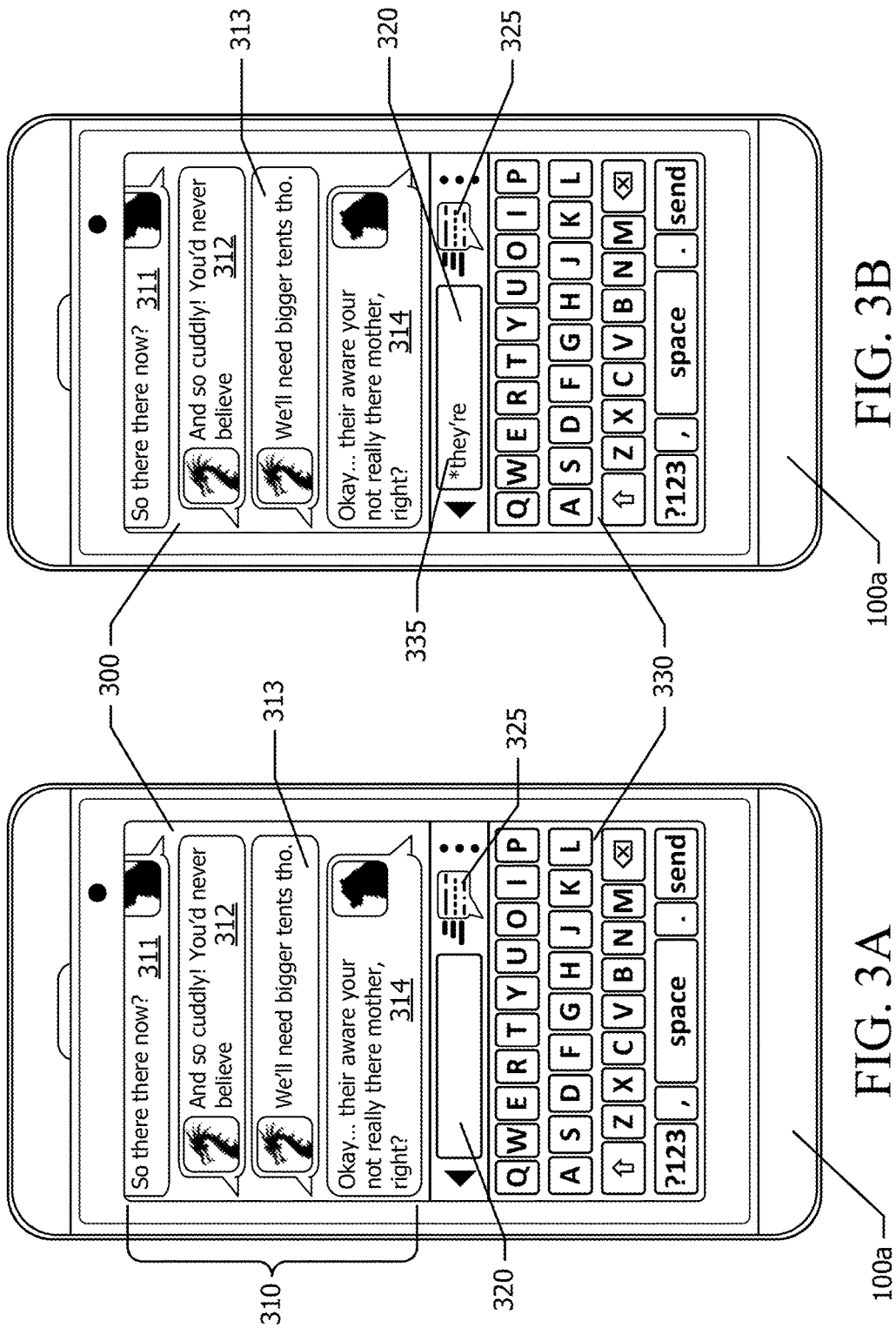

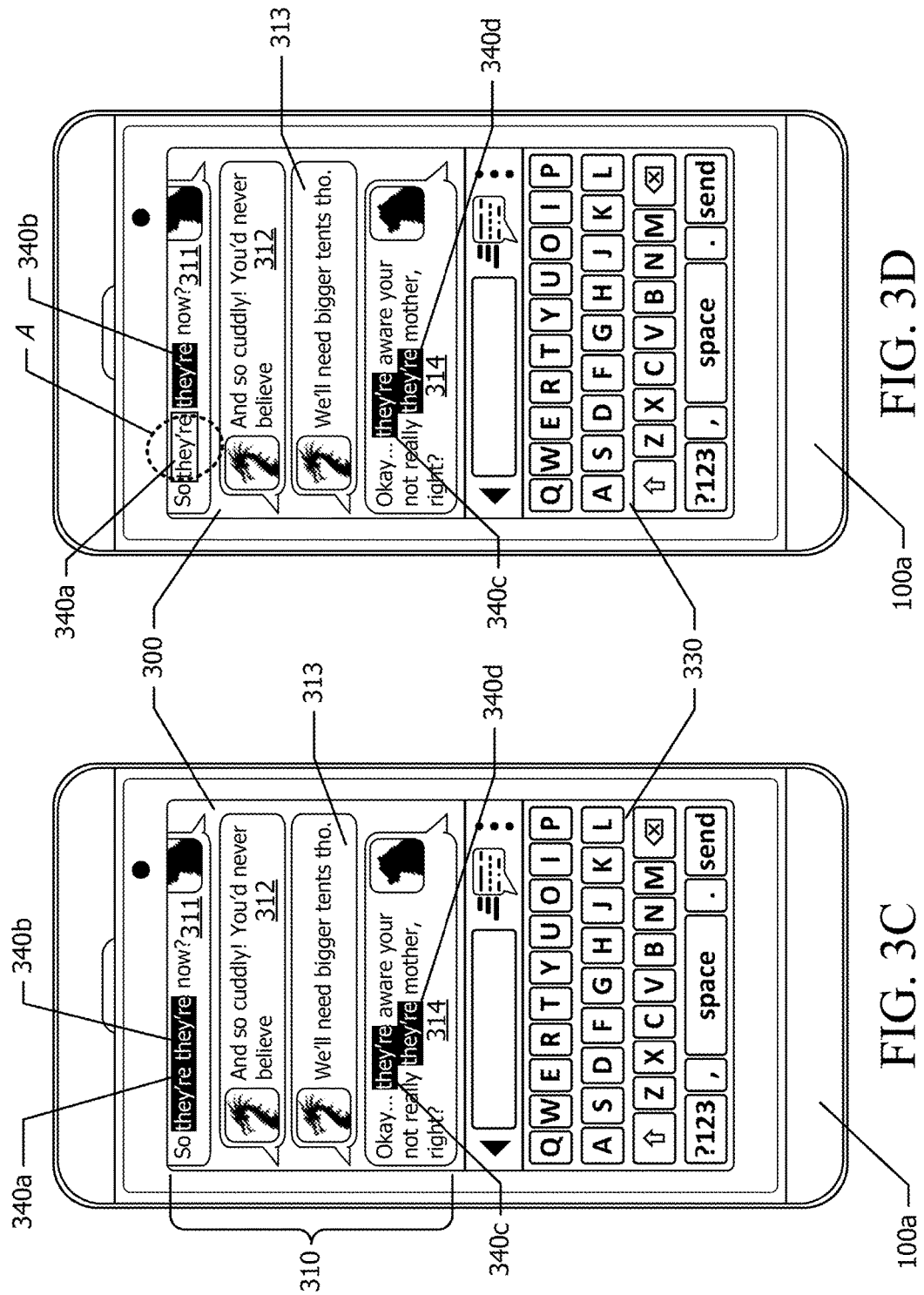

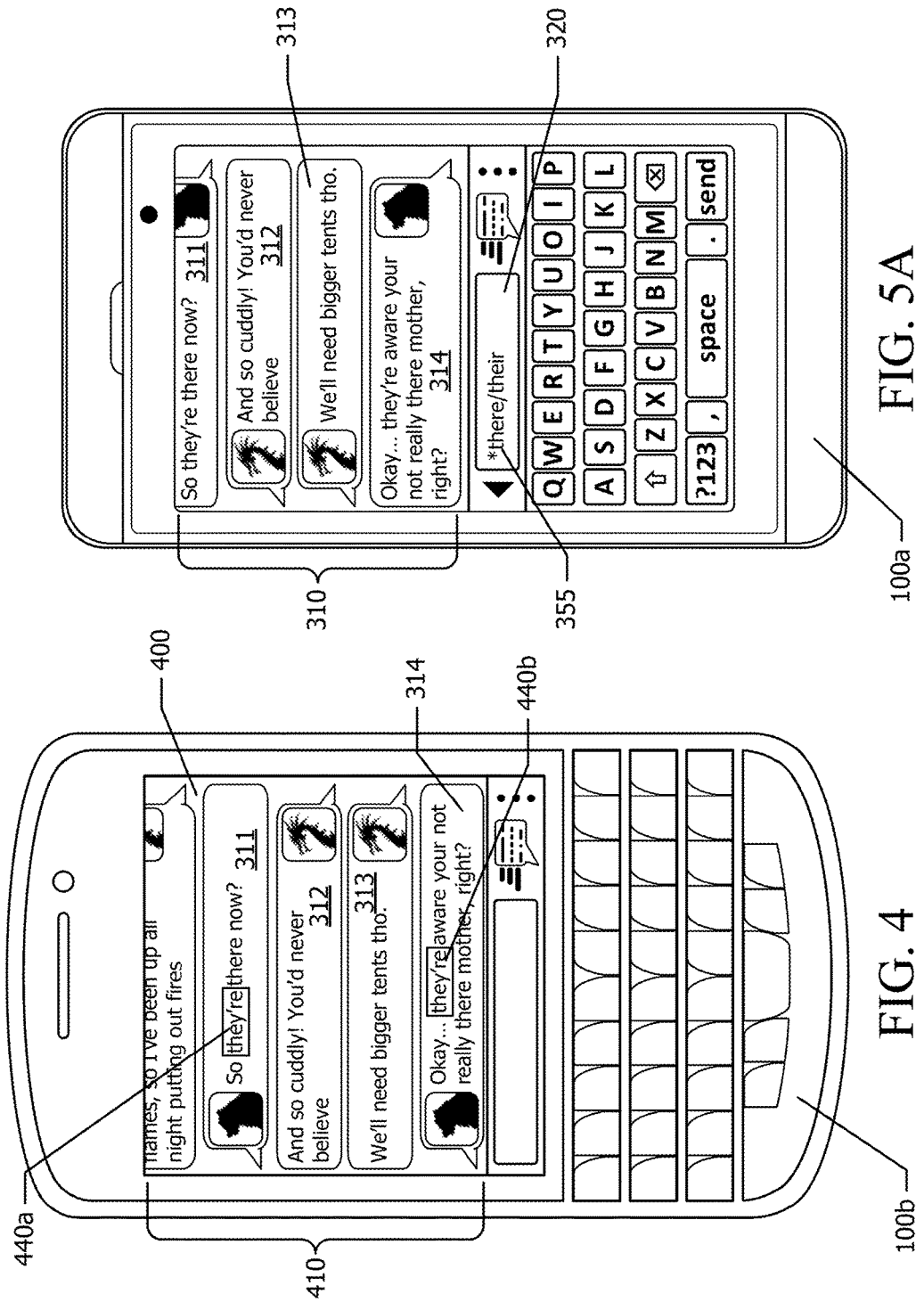

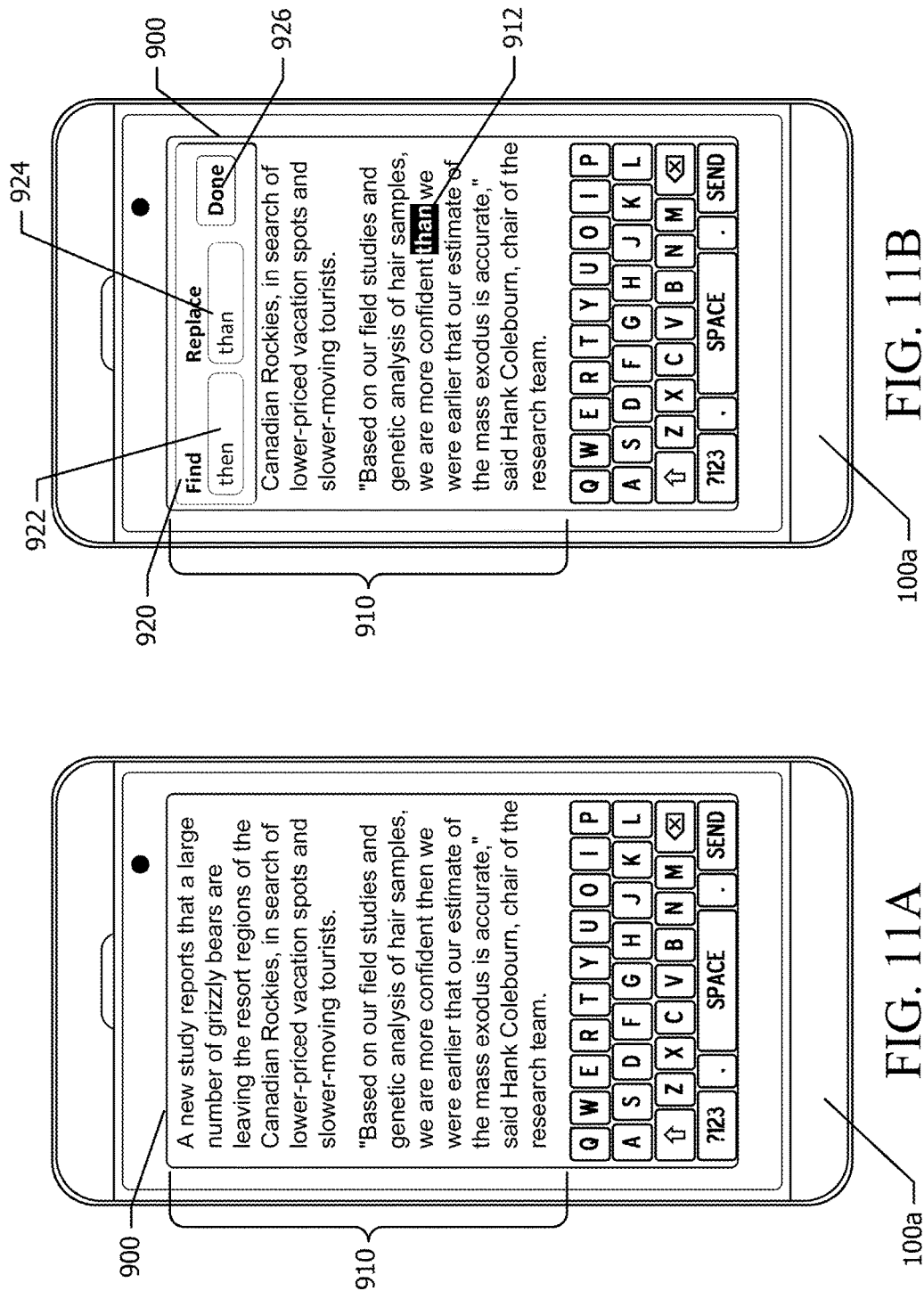

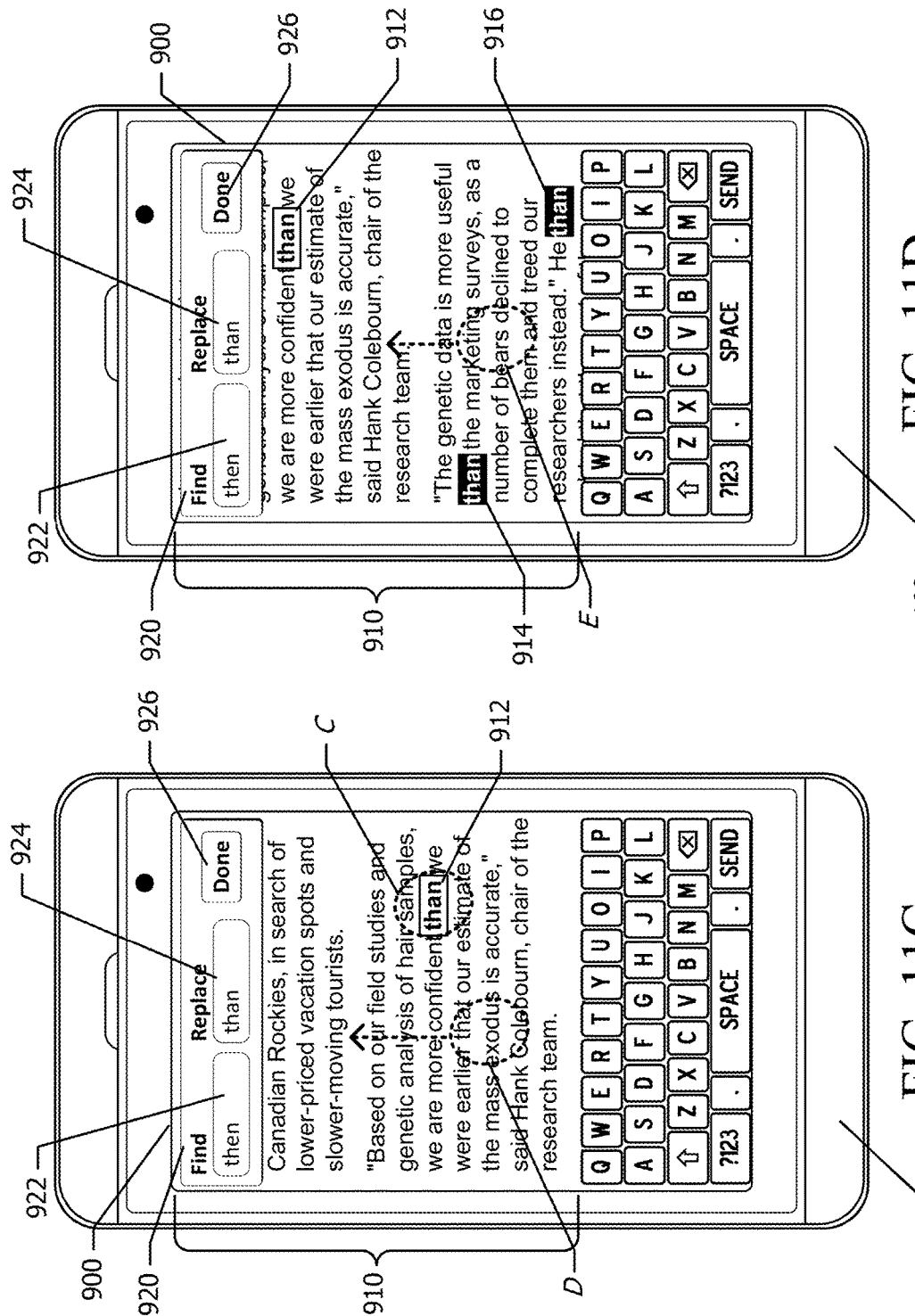

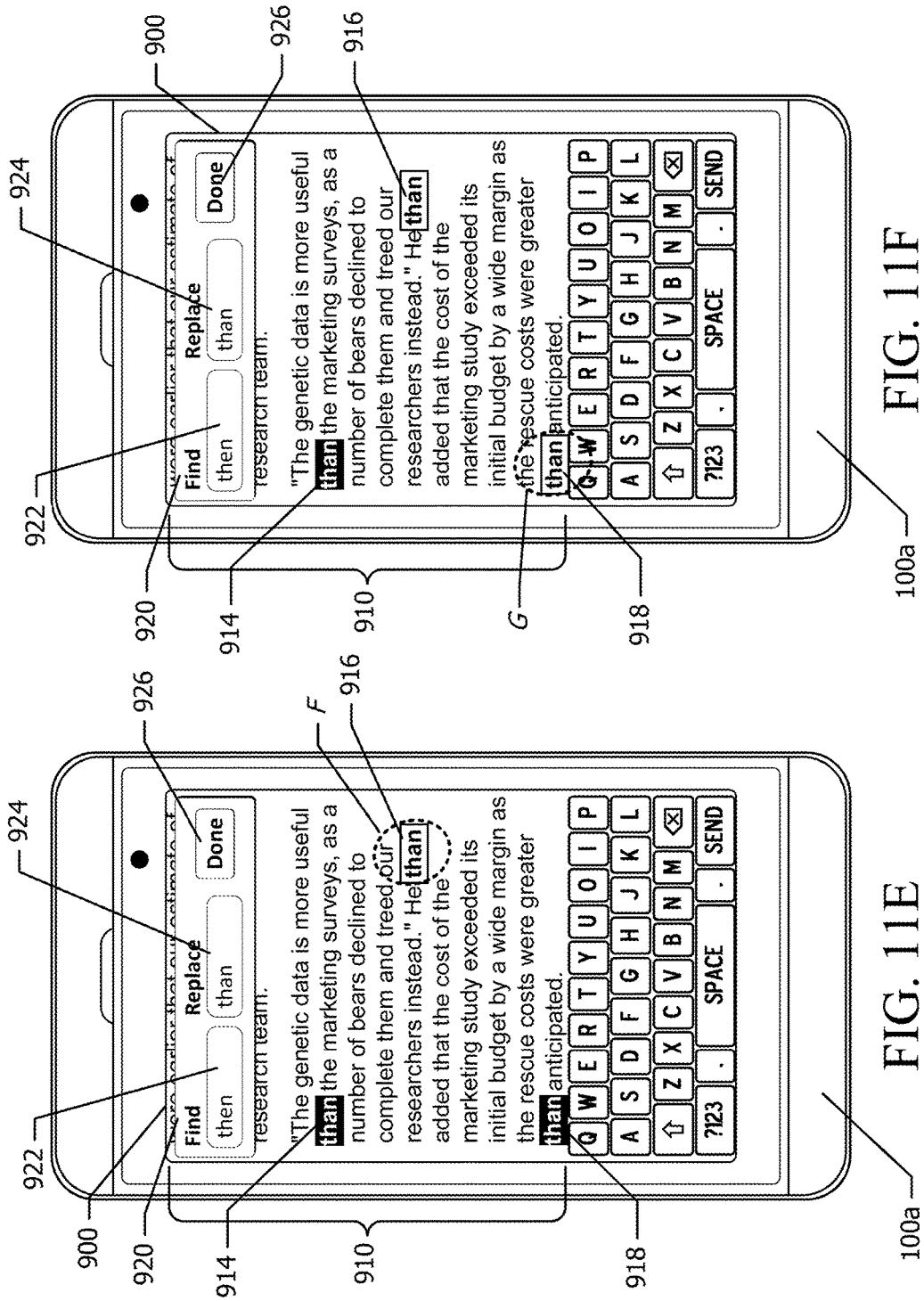

MESSAGE CORRECTION AND UPDATING SYSTEM AND METHOD, AND ASSOCIATED USER INTERFACE OPERATION

BACKGROUND

1. Technical Field

The present application relates generally to messaging, and in particular retroactive editing or correction of sent messages.

2. Description of the Related Art

Mobile communication devices, such as smartphones, tablets, and the like, are typically used for electronic messaging using different formats and protocols, such as email, instant messaging, short message service, and the like. Message content is composed on the device using the device's input mechanisms, such as the keyboard, touchscreen, or microphone; this input message content can be edited onscreen prior to transmission to a recipient at a designated address.

On small mobile devices, message content input can be cumbersome due to the relatively small physical keyboard or virtual touchscreen keyboard; typographical errors can occur as a result of the user's touch landing on the wrong physical or virtual key. While various solutions have been developed to reduce the incidence of typographical errors, such as automated spellchecking and correction, keyboards providing predictive text suggestions, and speech-to-text systems, these solutions do not always prevent mistakes; indeed, some of these solutions can result in the insertion of entirely incorrect words in a message. The user may not realize that typographical or other errors remain in the message content until after the message has been sent.

BRIEF DESCRIPTION OF THE DRAWINGS

In drawings which illustrate by way of example only embodiments of the present application.

FIGS. 3A to 3F are illustrations of user interface views displayable by the electronic device during a message update operation.

FIG. 4 is an illustration of a message display view of a recipient device after receiving a message update.

FIGS. 5A and 5B are further illustrations of user interface views during a message update operation.

FIGS. 11A to 11H are illustrations of user interface views in a further content updating operation.

DETAILED DESCRIPTION

The embodiments described herein provide a method, electronic device, system, and non-transitory medium providing certain improvements in the operation of messaging and text editing applications, including operation of a user interface facilitating identification and application of retroactive corrections to user content.

Figure 1:
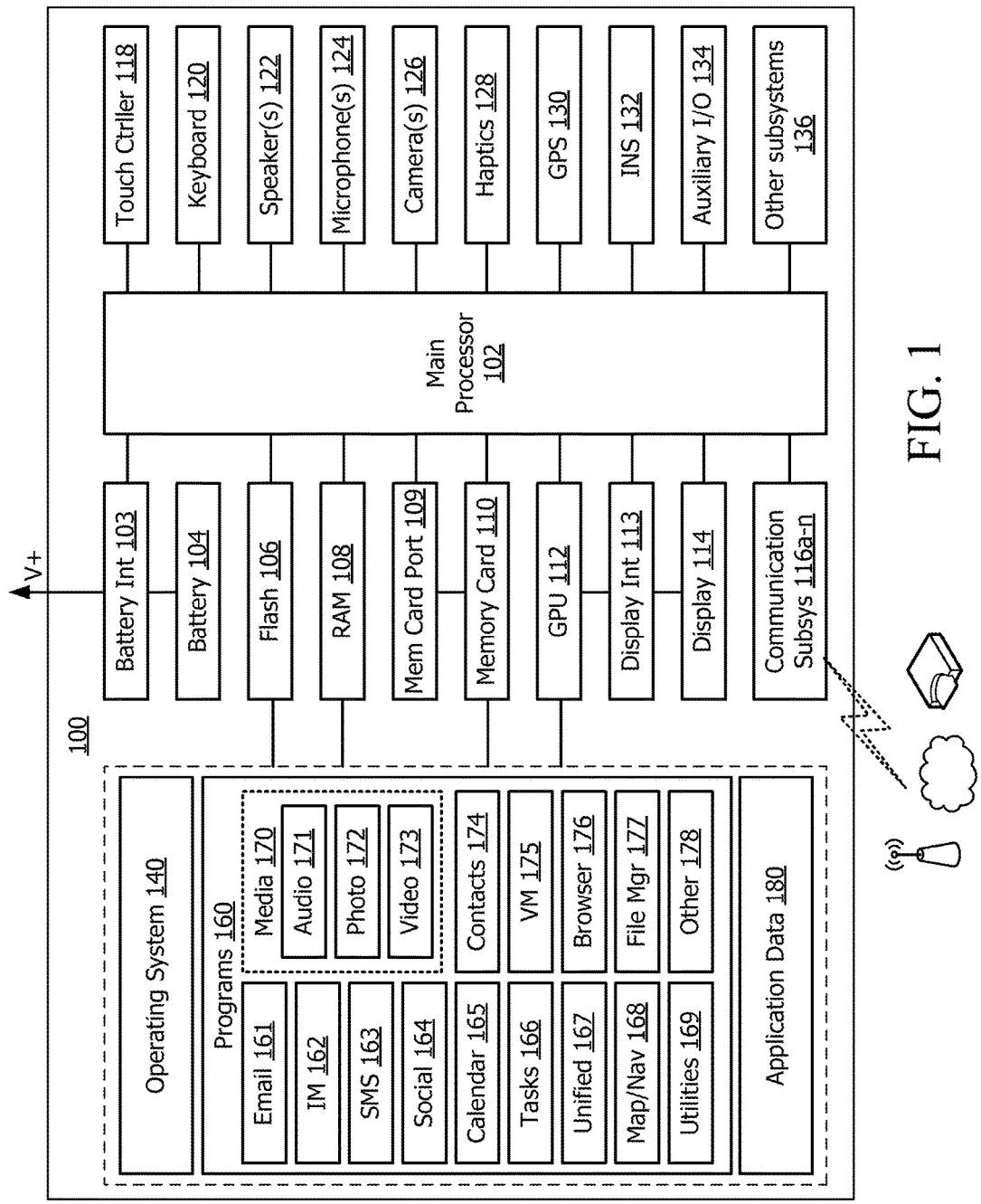
FIG. 1 is a block diagram of an example electronic device for use with the embodiments discussed herein.

The examples set out below are described and illustrated primarily in the context of a handheld mobile device with a touchscreen interface. FIG. 1 is a block diagram of select components of an example electronic device 100 suitable for use with these examples. It will be understood by those skilled in the art that the components illustrated in FIG. 1 are merely representative of particular aspects of the electronic device 100, and that other components that are typically included in such a device have been excluded in the drawings and this description only for succinctness. Furthermore, those skilled in the art will understand that the device 100 may be successfully used with the various examples described herein even when some components described in relation to FIG. 1 are omitted.

Operation of the electronic device 100 is generally controlled by a main processor or processors 102. The device 100 may be a battery-powered device and would thus include a battery interface 103 connecting to one or more rechargeable batteries 104. The batteries may be removable or non-removable. The interface 103 can include an adaptor for receiving and converting mains power to power the device and/or charge or recharge the battery 104. Data, programs, and other instructions or information can be stored in one of several possible memory components in the device 100, such as flash memory 106, random access memory (RAM) 108, or other storage elements such as a memory card 110 received in an integrated memory card port 109. Typically, software and data components such as the operating system (OS) 140, programs (applications) 160, and application/user data 180 are stored in resident persistent memory such as the flash memory 106, and some components of the OS 140 may be embedded as firmware in integrated memory in the processor 102. However, portions of such components may be temporarily loaded into a volatile store such as the RAM 106, or on the memory card 110.

Communication functions, including data and optionally voice communications, are performed through one or more communication subsystems 116a-n in communication with the processor 102. Other functional components used to accomplish communication functions, such as antennae, decoders, oscillators, digital signal processors, and the like, may be considered to be part of these subsystems. Wireless communication subsystems 116a-n are used to exchange data with wireless networks or other wireless devices in accordance with one or more wireless communications standards. New wireless standards are still being defined, but it is believed that they will have similarities to any network or communication behavior described herein, and the examples described here are intended to be used with any suitable standards that are developed in the future. The wireless link connecting the communication subsystems 116a-n may operate over one or more different radiofrequency (RF) channels according to defined protocols, such as wireless LAN (e.g., one or more of the 802.11™ family of standards), near-field communication, Bluetooth® and the like. The particular design of a communication subsystem is dependent on the communication network with which it is intended to operate.

The electronic device 100 is provided with at least a display output interface 113 that connects to a display screen 114, which is either integrated into the device 100 (particularly if the device 100 is intended to be mobile or portable)

or external to the device 100. Graphics data to be delivered to the display screen 114 via the interface 113 is either processed by the main processor 102, or optionally by a separate graphics processing unit (GPU) 112. In some examples, such as those discussed below, the electronic device is a touchscreen-based device in which a combination display screen-touch interface is a primary user interface mechanism, communicating information and presenting graphical user interfaces to the user while also receiving user input that may be converted into instructions for execution by the device 100. In such cases, the display screen 114 may comprise a touchscreen digitizer layered on the actual display component (e.g. liquid crystal display) of the display screen 114, in communication with a touchscreen controller 118 that processes detected touches and gestures on the touchscreen. The construction and operation of a suitable display screen and/or touchscreen interface will be understood by those skilled in the art. In some implementations, the electronic device 100 is configured to output data to an external monitor or panel, tablet, television screen, projector, or virtual retinal display, via a data port or transmitter, such as a Bluetooth® transceiver, USB port, HDMI port, DVI port, and the like. Generally, as referred to herein, "display", "display screen", and "display interface" are intended to encompass all implementations with integrated and external display screens unless expressly or implicitly stated otherwise.

The processor 102 also interacts with additional subsystems, if present. This can include I/O devices, sensors, and other components such as a keyboard 120, speaker(s) 122, microphone(s) 124, camera(s) 126, haptics module 128 (e.g., a driver and a vibratory component, such as a motor), GPS or other location tracking module 130, other auxiliary I/O ports 134, and other subsystems 136. Other I/O subsystems can include pointing devices or touch devices such as trackballs, IR fingerprint detectors, roller wheels, optical joysticks, and trackpads. The electronic device 100 may also be provided with an orientation or inertial navigation sensor 132 such as one or more accelerometers, used to detect the orientation of the device 100. Not all of these subsystems are required, and many may be omitted. For instance, where the primary user interface is a touchscreen, a physical keyboard may be omitted altogether. Some subsystems may be provided instead as peripheral devices that connect to the device 100 using a data port or transmitter.

FIG. 1 also illustrates software modules, including the OS 140 and programs 160 that may be present on the device. Not all of the modules illustrated need be provided on the device, and other software components may certainly be provided on the device instead. Programs 160 may be installed on the device 100 during its manufacture or together with the loading of the OS 140, or at a subsequent time once the device 100 is delivered to the user. The OS 140 and programs 160 may be loaded onto the device 100 through at least one of the communication subsystems 116a-n, an I/O port, or any other suitable subsystem.

Specific examples of applications that may be resident on the electronic device 100 include an email messaging application 161, as well as other types of messaging applications for instant messaging (IM) 162, Short Message Service (SMS) 163, and social networking or messaging applications 164. Other applications for messaging can be included as well, and multiple applications for each type of message format may be loaded onto the device 100. There may be, for example, multiple email messaging applications 161, and multiple IM applications 162, each associated with a different user account or messaging service. Alternatively, other means may be implemented on the device 100 to provide access to multiple messaging accounts or message types; for example, a unified inbox application 167 may be provided on the device as an application or as part of the OS. The unified inbox application is configured to list messages received at and/or sent from the device 100, regardless of message format or messaging account.

Other applications include a calendar application 165, task application 166, map or navigation application 168, utilities 169, media player 170 including audio 171, photo 172, and video 173 components for playback, recording, and/or editing of media files, contacts or address book application 174, browser 176, file manager 177. Other applications 178 may be included. Again, not all of these applications need be provided on the device 100. One or more virtual machines 175 may also be resident on the device 100, possibly integrated with the OS 140, to provide discrete runtime environments for executing code on the device 100.

The memory of the device 100 also houses the application data 180, which can include configuration information, and data stores for user data. Permission to access the data store for a given application may be limited to the associated application, although permissions may be configured differently so that other applications or functions executing on the device have access to data objects stored in the data stores, or at least have access to metadata for these objections.

While the example electronic device 100 is a wireless communication device and may be referred to herein as a "handheld" or "mobile" device, it will be appreciated by those skilled in the art that this description is not intended to limit the scope of the described embodiments to implementation on devices with a specific form factor or devices that are intended primarily or solely for communication or productivity. The examples herein may be applied to any appropriate data processing device adapted to communicate over a fixed or wireless connection, whether or not the device is portable or wirelessly enabled, whether or not provided with voice communication capabilities, and regardless of its primary intended usage, such as productivity or entertainment. Suitable devices may therefore include, without limitation, cellular phones, smartphones, wireless organizers, personal digital assistants, desktop computers, notebook computers, laptops, tablets, terminals, gaming devices, and the like. Unless expressly stated, an electronic device 100 may include any such device. The configuration and operation of all such devices is generally known to those skilled in the art.

The electronic device 100 may be provisioned with single or multiple messaging accounts employing one or more different messaging formats or types, which can include email, Short Message Service (SMS), Instant Messaging (IM), Multimedia Messaging Service (MMS), Visual Voicemail (VVM), PIN-based messages (messages addressed using an alternate identifier, such as a proprietary address or hardware identifier), social network messages or notifications, and calendar and task events (if not transmitted as attachments to other messages).

The formatting and transmission of all such messages, storage and indexing of such messages, and the implantation of suitable messaging infrastructures to support all of these example communications will also be known to those in the art. For example, email messages and services may be constructed and implemented in accordance with known Internet messaging standards including Internet Message Format RFC 5322 and RFC 2822, published by the Internet Engineering Task Force, as well as their predecessor, successor, and companion standards. IM messages include network-based and peer-to-peer messages, and such messages and services may be defined in accordance with known standards such as RFC 2779 and RFC 3921 also published by the Internet Engineering Task Force, and their companion, predecessor and successor standards. Point-to-point SMS messages may be implemented in accordance with 3GPP ($3^{rd}$ Generation Partnership Product) Technical Specification 03.40, and optionally extended for transmission of MMS messages as specified by the Open Mobile Alliance Multimedia Messaging Service V1.3, and their companion, predecessor and successor standards. Regardless, all such messages and services intended for use with the within embodiments may also be defined in accordance with proprietary standards and protocols. Messages may be defined, formatted, and presented using messaging applications implemented on user devices such as the electronic device 100 described above. Messages are typically identifiable by a unique or quasi-unique handle or identifier (ID), implemented within the message format in a suitable location, for example in a header of the message. Some message formats may not include a header distinct from the body in the manner of an email format, but may nevertheless comprise content in a payload portion in addition to metadata. Some message types permit messages to be interrelated, for example by cross-referencing identifiers, thread identifiers, subject line, or the like, as discussed below. Whether interrelated or not, messages exchanged between a given set of participants (senders and recipients, or originating and recipient or destination devices) may be presented by messaging applications in a conversational paradigm, chronological order, or reverse chronological order, or in any other suitable presentation form or order.

Figure 2:
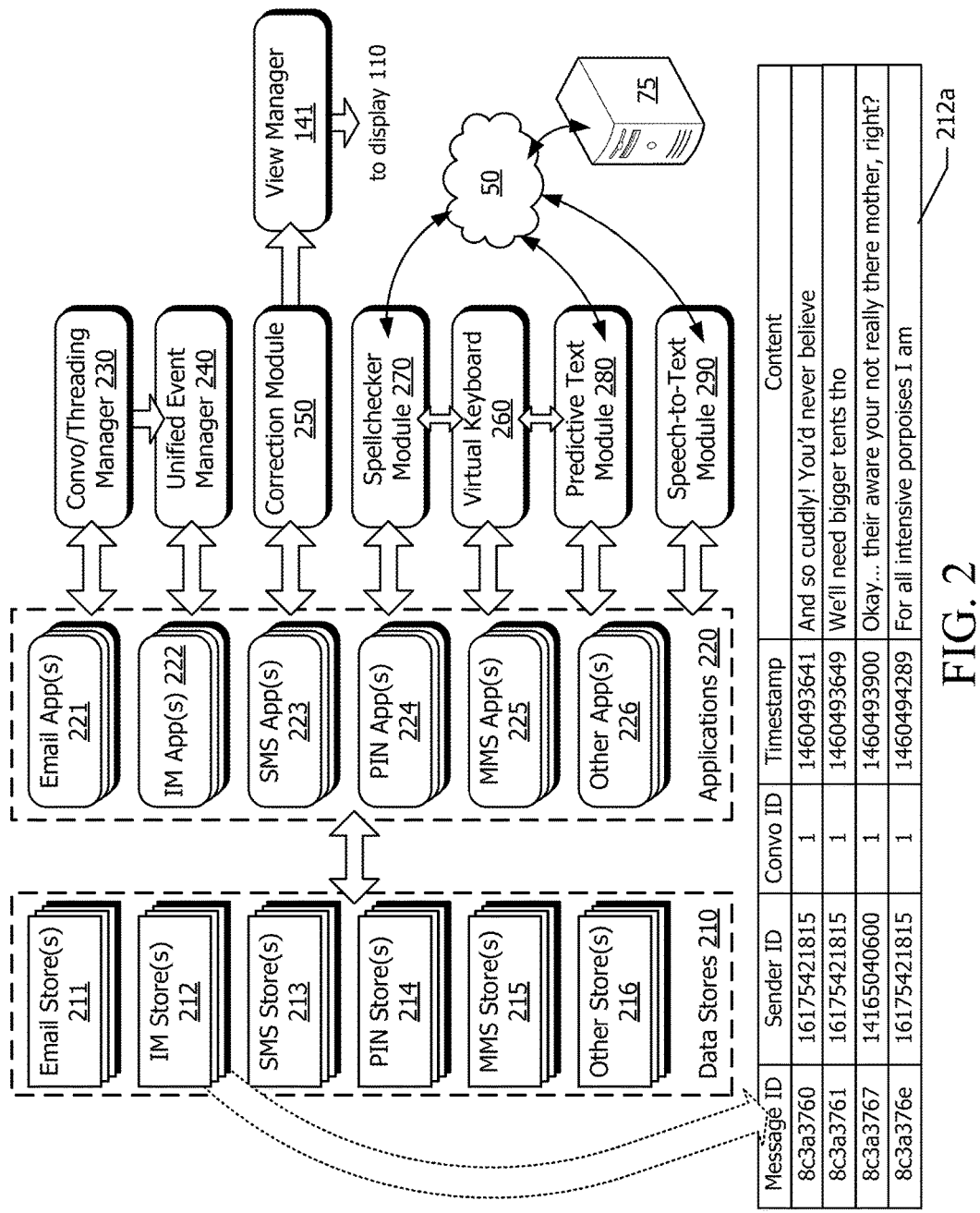
FIG. 2 is a block diagram illustrating possible components of the electronic device of FIG. 1 and interaction between the components.

FIG. 2 is a block diagram illustrating select components on the electronic device 100 pertaining to the management of communication event data. Data accessible to the electronic device 100 is provided in a number of data stores 210, which may be maintained in memory resident in the electronic device 100 itself, and typically in persistent memory. As can be seen in FIG. 2, the data stores 210 include stores for each type of message or notification serviced on the electronic device 100; thus, there may be one or more of an email store 211, IM store 212, SMS store 213, PIN store 214, MMS store 215, and other stores 216. The stores 210 may be associated with a dedicated messaging or notification application or function executing on the device, and/or with a particular message format. Since a device 100 may be provisioned with multiple user accounts for similar message formats, each provisioned account may be allocated its own distinct data store; therefore, there may be multiple email data stores 211, multiple IM stores 212, and so on. Example content of an instant messaging store 212a is illustrated in FIG. 2; the store 212a can include, for each message, a message ID, an identification of the sender and/or recipient of the message, a conversation identifier, timestamp, and message content. This information can be maintained in a single table or data structure, or in multiple data structures making up the data store 212a. The messaging data stores 210 maintained at the device 100 may represent only a portion of the complete message data associated with a given format or account. Complete data stores may be maintained at a remote location, such as a message server system available over a wireless network connection.

Typically, each data store 210 is under the control of and is accessed by a corresponding or dedicated application 220. FIG. 2 illustrates that there is an application 220 corresponding to each of the data stores 210; thus, there are one or more email applications 221, IM applications 222; SMS applications 223, PIN applications 224, MMS applications 225, and other applications 226. When a new communication event (e.g., a message) is obtained by the electronic device 100 or a change to an existing communication event is detected (e.g., a new message is received or sent, or an update to a previous message is received), the appropriate application 220 is notified, if the application 220 itself was not the source of the new or changed communication event. The application 220 can then store the new or changed communication event in its corresponding data store 210. A change to a communication event that was previously stored in a data store 210 may result from the user editing or altering a message that was previously sent from the device 100, or from the device 100 receiving or sending a message, or from the device 100 receiving an updated or replacement version of a message previously received. Changes can also include changes to the communication event's status or attributes (e.g., metadata, such as a "new" or "read" status).

The various data stores 210 thus comprise a set of communication event data sources that can be directly accessed by their respective custodian application 220, and processed in diverse ways for customized presentation by the application 220. For example, the electronic device 100 can include a conversation or threading manager that correlates messages in one or more data stores with others to sort or categorize the messages into common threads or conversations, or a unified event manager 240 that collates communication events from different data stores 210 and presents them in a single user interface.

During execution, the various messaging applications 220 may require services from other applications executing on the device, or services supplied remotely over a network connection. For example, when the device 100 is a touch-screen device, the OS 140 may include a virtual keyboard module 260 that can be invoked by any application requiring text or character data entry. Another example of a service is a spellchecker module 270, which may be called by different applications 160 to execute a spellchecking process on application data. For instance, when a user enters message text in an input field of a messaging application 220, the messaging application 220 can call the spellchecker function provided by the module 270 and pass the input message text to the module 270. The function may also be invoked by the virtual keyboard in some implementations. The module 270 can then compare the message text to a dictionary or use other analytical methods to identify any spelling or grammatical errors in the message text, and display the results to the user in a user interface view. Similarly, the device 100 can include a predictive text module 280, which when invoked by a virtual keyboard 260, analyzes the keyboard input and predicts possible intended words from the input, and returns these predictions for selection by the user. The user can then select a predicted word instead of continuing to type the word. The device 100 can also include a speech-to-text module 290, which may be invoked by a messaging application 220. Rather than type a message, the user can speak and have his or her speech detected by the microphone 124; the module 290 converts the speech to text and provides this text to the application 220. As indicated in FIG. 2, these various modules (spellchecker module 270, predictive text module 280, speech-to-text 290) can be supported by remote services 75 accessible over a network 50. Input speech may be transmitted to the service 75, where it is converted to text; the text is sent by the service 75 back to the device 100. Similarly, a remote service 75 can provide spellchecking functions or predictive text functions over the network 50, or at least store backup copies of dictionaries and other data used locally on the device 100 to carry out spellchecking and predictive text functions.

The device 100 in these examples also includes a correction module 250, which can be invoked to effect retroactive corrections to messages sent by various messaging applications or other content composed by the user on the device 100. The correction module 250 in some implementations may be incorporated within the application 220. The correction module 250, as do other applications 220, communicates with a view manager 141 that manages user interface screens that are displayed to the user. The configuration and operation of the correction module 250 is described in further detail below.

On small mobile devices, message content input can be cumbersome due to the relatively small physical keyboard or virtual touchscreen keyboard; typographical errors can occur as a result of the user's touch landing on the wrong physical or virtual key. Sometimes, to the user's chagrin, the mistake is not noticed until after the message has been sent to the recipient. To address this problem and to generally speed up the rate of text entry on small mobile devices, automatic spellchecking and correction and predictive text tools have been developed. The former can automatically check input words against a dictionary to determine whether they are correctly spelled, an automatically correct a misspelled word; the latter predicts from the initial characters entered by a user what word the user is likely to be typing, based on dictionary information and/or user messaging history, and either autocompletes the user's typing with the predictive word, or displays the predicted word for the user to select. Speech-to-text services have also been implemented, which can recognize the user's input speech as detected by the device's microphone and convert the speech to text; the device can parse the resultant text to identify commands for execution and message content to be sent to a recipient. These solutions can reduce the amount of physical or virtual typing required of the user, and thus reduce the incidence of typographical errors.

As convenient as these solutions are, however, they are not always foolproof. The word the user intends to use may not actually be present in the dictionary; the predictive text tool may predict the wrong word; or the user's diction or interfering background noise may prevent the speech from being properly recognized. In a user's haste to compose and send a message, a typographical error might be avoided, but the entirely wrong word used instead. Again, the mistake may not be noticed until after the message was sent.

Some typographical or wrong-word mistakes may be inconsequential, but they are often distracting or obscure the intended meaning of the user's message. The sender of the message can acknowledge the earlier error by sending yet another message to the recipient pointing out the error, and repeating the message with a correction, or by simply providing the correct word, leaving it to the recipient to figure out where the correct word is to be inserted in the previous message. This can be disruptive to the communication flow between the sender and recipient.

Figures 3E, 3F:
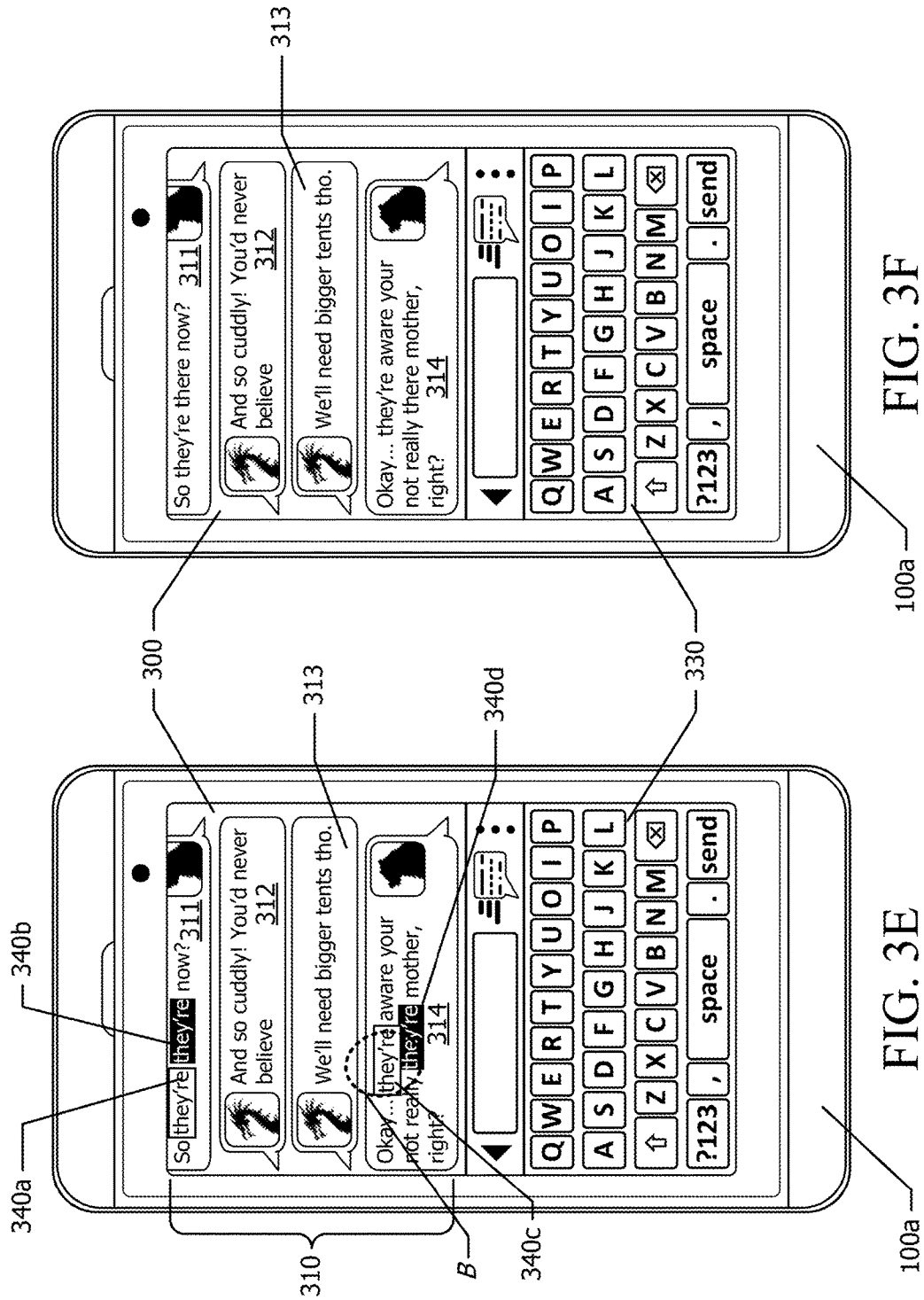

Accordingly, an improved method and system are provided for retroactively correcting and updating previously stored and/or sent content and messages in a more efficient manner. Examples are illustrated in the example user interfaces 300 of FIGS. 3A through 3F. FIG. 3A illustrates a user interface 300 comprising a first view of a messaging application, such as an instant messaging application 222, executing on a user electronic device 100a. The user interface 300 in this example includes a message history pane 310, which displays previous messages in a conversation with a particular recipient in chronological order (i.e., with the most recent message sent or received at the bottom of the pane 310). In the illustrated example, messages 311, 312, 313, and 314 in a conversation are displayed in chronological order, with message 314 being the most recently sent or received message. Messages 311 and 314 in this example are messages composed and sent by the user of the device 100a, which can be considered the "sending" device with reference to these messages; messages 312 and 323 are messages received from the recipient of messages 311 and 314. As is generally known in the art, this message pane 310 can be scrollable (e.g., in response to a swipe touch input received via the touchscreen 110, or another user input device) so that earlier messages in the conversation can be displayed in the user interface 300.

The user interface 300 also includes an input field 320 for receiving input content (e.g., text and/or selections of emoticons or other graphics for inclusion inline in a message sent from the electronic device 100a), and other user interface elements for selecting files for attachment to a message, and the like. Typically, a user makes use of a text input mechanism such as a physical keyboard 116 or virtual keyboard 330 (included in the user interface 300 in this example) to enter text or other content for a message to be sent by the messaging application in the input field 320. However, other mechanisms for input may be used. For example, as mentioned above, a speech-to-text module 290 executing at least in part on the device 100a may be used to receive speech via the microphone 120, recognize the speech and convert the speech to text, and enter the text into the input field 320 or otherwise display the text for review and optional editing by the user prior to sending. Once content is input in the input field 320, or ancillary content (such as attachments, photographs, etc.) have been selected for transmission to the recipient, transmission of the input content or ancillary content can be initiated by actuation of a "send" user interface element 325, whether by a touch input (e.g., by tapping the element 325) or another form of user input. In some messaging applications such as instant messaging and SMS, transmission of content can be initiated by a designated keyboard 116 or virtual keyboard 330 key, such as a "send" or "return" key.

In this example, messages 311 and 314 include grammatical errors introduced into the message text by the user who created the message ("there" instead of "they're" or "their"), either by direct typing input into the input field, or as a result of an autocorrect, predictive text, or speech-to-text error. If the sender of messages 311 and 314 notices the error after the message is sent, conventionally the error can be acknowledged by the sender by sending a further message indicating how the sender intended the message to read, whether by repeating the entire message, spelled correctly, or by sending a brief message consisting mainly of the correct word, such as a simple "they're". However, in the first case the conversation with the recipient is confusingly extended, as the recipient must decipher why a virtual repeat of the previous message was sent; and in the second case, it may not be clear where in the previous message the corrected "they're" was intended to be read (and in addition, the flow of the conversation is again confusingly extended with an extra message). Indeed, the error may have been introduced in an earlier message, not the most recent message sent by the sender, in which case a subsequent correction message will appear more confusing to the recipient.

Thus, in these examples, the sender's intended correction is applied to previous messages in the conversation in a manner that simply replaces the incorrect message in the conversation history of the recipient, and permits the sender to efficiently indicate where a correction is to be applied. The intended correction can be entered by the sender in the same input field 320 used for entry of message content. Turning to FIG. 3B, and example of an intended correction 335 is entered in the input field 320. Here, the input 335 comprises an indicator or token signifying a replacement operation to be executed (the asterisk, "*") followed by the correct content that is intended to replace content of a previous message ("they're"). The format of the example corrective input 335 is only one example; other forms of input containing an indicator or token that can enable the input to be recognized as an instruction to execute a replacement operation can be used, such as dash characters (e.g., "-they're-") or slashes indicating the original incorrect word followed by the correct word (e.g., "there/they're"). An input similar to the latter example is described with reference to FIGS. 5A and 5B.

After the user indicates completion of the corrective input 335 (for example, by tapping the "send" button 325 or tapping the "send" or "enter" key on the keyboard 330), the input is then parsed to determine whether the input comprises a corrective input rather than content to be transmitted as a new message. The parsing may be carried out by the messaging application 222 itself, if the correction module 250 is incorporated into the messaging application 222; or else the messaging application 222 can pass the input received in the input field 320 to a separate correction module 250 executing on the device 100a for parsing. This parsing may comprise scanning the input content 335 for a leading character matching an expected indicator or token (e.g., the leading "*") followed by an operand such as a string of characters, or for one or more operands set off by indicators or tokens (e.g., a string of characters set off by dashes, or strings of characters separated by a slash). If an indicator is found, the input 335 is determined to be a corrective input, and the characters set off by or following the indicator comprise the operand to be used in carrying out the replacement operation. Using the operand, one or more corresponding portions of message content, such as strings of text, are identified in at least the previous message sent from the 100a as candidates for the replacement operation. More than one previous message may be scanned for a corresponding content portion; for example, the last two previous messages, or all messages sent within a defined timeframe (e.g., within the past hour) may be scanned. The identification of these portions of message content is discussed in further detail with reference to FIG. 7, but in the example of FIGS. 3A-3F, the correction module 250 at least identifies possible homophones corresponding to the operand, for example by executing a lookup of homophones and/or homonyms of the operand in a correction module dictionary. Since the operand in this example is "they're", possible homophones in this case are "their" and "there". The correction module 250 then compares the content of the previous message (or multiple previous messages) to locate content portions matching these homophones. Again, this identification and location of matching content portions can be executed by the message application 222 itself if the correction module 250 is integrated into the application 22, or else the identification can be carried out by a separate correction module 250.

If no corresponding content portions in previous messages have been identified, the input 335 may be treated as a regular message, and transmitted as usual by the messaging application 222 to the recipient. However, if any corresponding content portions are identified, the user interface 300 containing the view of the conversation history is updated on the device 100a to indicate the locations of the corresponding portions in context within the previously sent messages. The indication of these locations can include a visual demarcation or distinction, such as a special font decoration or style (e.g., highlighting, underline, and/or bold). As shown in FIG. 3C, the conversation history in the user interface 300 has been updated to show several strings in a highlighted mode, and replaced with the operand "they're" at 340a, 340b, 340c, and 340d in previous messages 311 and 314. In this manner, the potential replacement strings are shown within the previous message context, inline with the rest of the previous message content. In some implementations, the original corresponding portions may simply be visually distinguished in the user interface 300, but not replaced with the operand.

Once the corresponding strings have been visually distinguished in the user interface 300, the user confirms whether the replacement operation is to be carried out on each of these locations or not. As will be appreciated from a comparison with the original message content, not every visually distinguished string 340a, 340b, 340c, 340d requires replacement, since in some cases the original "there" is the correct word. Thus, as shown in FIGS. 3D and 3E, the user can individually select each corresponding string to be replaced by the operand, for example by a single tap or other gesture as represented by ovals A and B in FIGS. 3D and 3E. When each corresponding string is selected in this example, the visual demarcation may change to signify that the string was selected. In the example of FIGS. 3D and 3E, the highlighting colour changes for visually distinguished strings 340a and 340c to indicate a selection by the user. Alternatively, any visual demarcation may be removed from strings 340a and 340c, while the replacement string "they're" remains displayed. Once the user has completed selection of the visually distinguished strings, the user can provide a confirmation input (for example, tapping a "send" button again to indicate that all visually distinguished strings to be replaced have been selected. In response to this confirmation, the correction module 250 executes the replacement operation on the selected strings and replaces the original content portions with the operand in each message to which the replacement operation applies, and stores updated copies of each of these messages in the corresponding data store 212. The user interface 300 is then provided with an updated view of the conversation history, showing the updated messages, as in FIG. 3F.

The updated messages are then also transmitted to the user device 100b associated with the recipient. The user device 100b stores the updated messages, and optionally displays an indication that the messages have been updated in the appropriate messaging application. An example is shown in FIG. 4, which depicts a user interface 400 for a similar messaging application executing on the recipient device 100b. The user interface 400, like the user interface 300, comprises a view of a conversation history with the user of the device 100a, and so displays messages 311, 312, 313, and 314 in a similar arrangement although the formatting within the user interface 400 shows that the user of the device 100b is the recipient of messages 311 and 314. In this example, the replaced strings 440a, 440b are shown in a visually distinguished manner as well, to draw the user's attention to the particular corrections. Alternatively, the entire replaced message may be visually distinguished, or a toast (i.e., a transient notification) advising the user of the device 100b that changes had been made to previous messages may be displayed on the screen of the device 100*b*. The replacement process is described in more detail with reference to FIG. 10.

The user wishing to make corrections to previous messages may be able to trigger the replacement operation using other indicators or tokens entered in the input field 320. As discussed above, a possible input can include multiple operands: both the original content to be replaced, as well as the replacement content. This is illustrated in FIG. 5A, which depicts input 355 as "*there/their". To avoid ambiguity with message content using a slash character, the input is combined with a leading asterisk ("*") to designate the input 355 as a corrective input. It will be appreciated by those skilled in the art that alternative input formats may be used to indicate both the original content and replacement content, such as "*replace [original content] with [replacement content]". While the leading asterisk is not necessary, it is advantageous to require a token of this type (i.e., a character or symbol not commonly used in text communication) in order to designate the input as a corrective input.

Figure 5B:
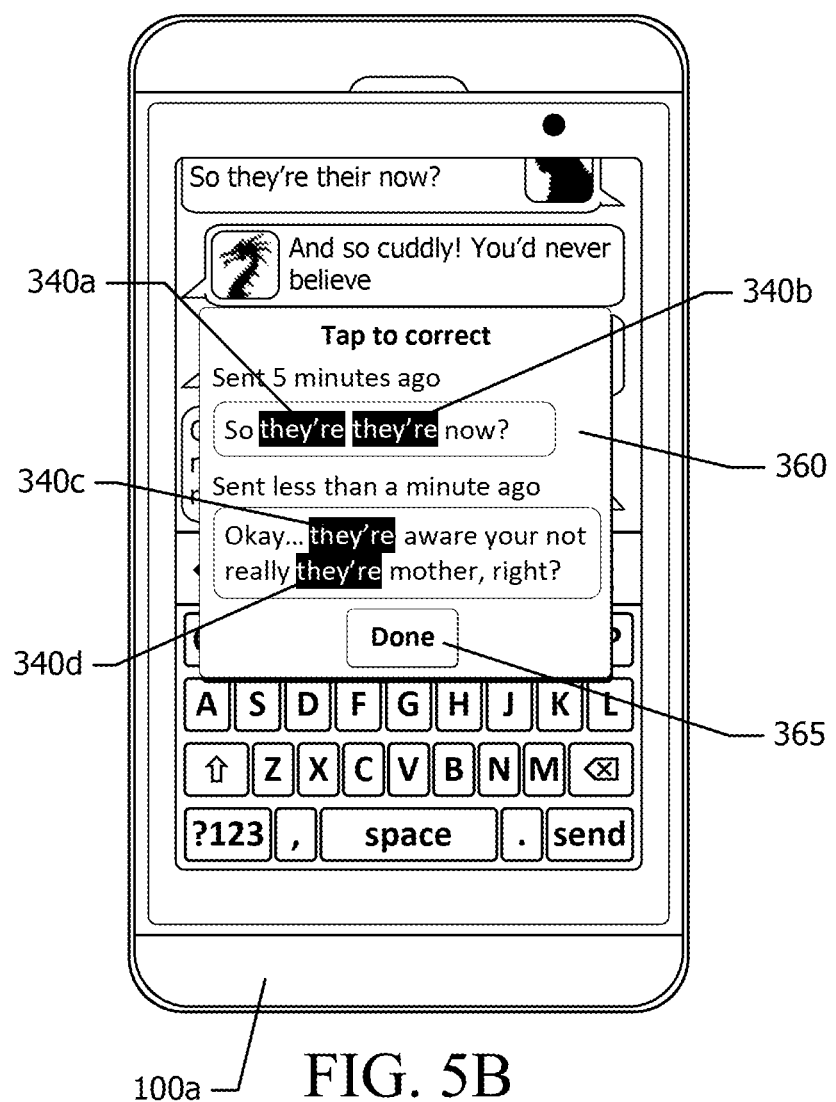

In this example, the correction module 250, on determining that the input 355 comprises a command to invoke the replacement operation and two operands, locates message content matching the first operand ("there") rather than identifying a set of homonyms or homophones to be matched, and visually distinguishes that matching content in the user interface 300. The visual demarcation and selection of content for replacement may be carried out just as depicted in FIGS. 3D and 3E, but in an alternative embodiment, the visual demarcation can be presented in an overlay display 360, as shown in FIG. 5B. In this example, the overlay display 360 still presents the same visually distinguished strings 340*a*, 340*b*, 340*c*, and 340*d* so they are still inline and in context with the containing previous message as in the previous example, but the display 360 is isolated from the conversation history and presented with instructions (such as the "tap to correct" legend and the "done" button) for improved clarity for the user. The selection of individual strings, such as 340*a* and 340*c*, may still be carried out as in FIGS. 3D and 3E, with the same changes in the visual demarcation upon selection by the user, and the user can indicate completion of selections by tapping the "done" button. The corrective module 250 can then execute as described above to update the previous messages and transmit the updated messages to the recipient device 100*b*.

Figure 6:
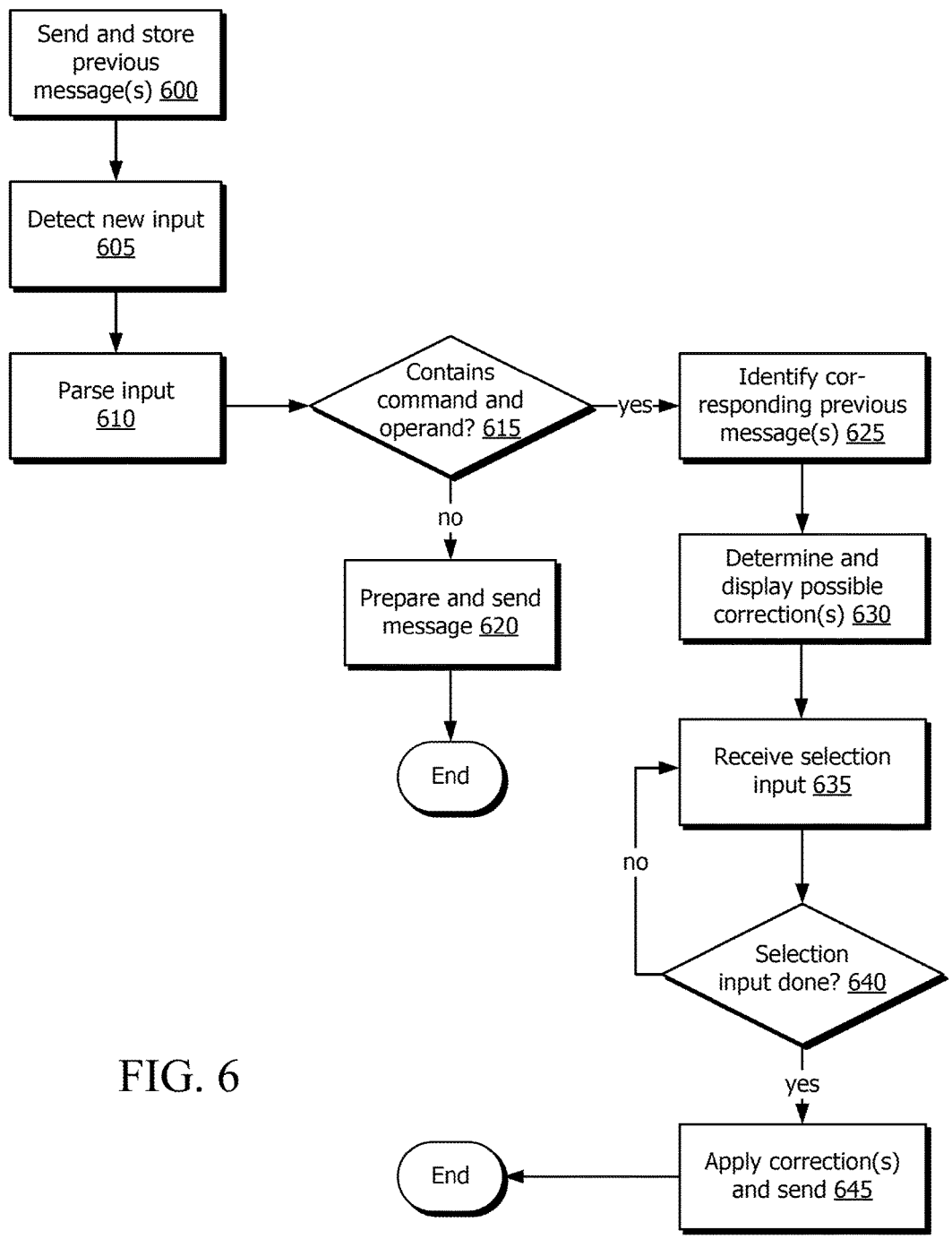
FIG. 6 is a flowchart illustrating a method of operation for the electronic device for updating a message.

FIGS. 6 to 10 illustrate the operation of the devices 100*a*, 100*b* in more detail. FIG. 6 is a flowchart presenting an overview of the operation of the correction module 250 and messaging application 222. At 600, the sending device 100*a* sends and stores one or more messages, referred to here as "previous" messages. At 605, a new input is detected in the input field 320, as described above. This input is parsed by the correct ion module 250 at 610. As mentioned above, the correction module 250 may comprise a module executing independently of the messaging application 22, and optionally available to more than one application 220 provided on the device 100*a*; in that case, at 610 the messaging application 222 first passes the received input to the correction module 250, so that the correction module 250 can parse the input to determine whether the input contains a command or identifier invoking the replacement operation, and an operand.

Parsing the input at 610 can comprise matching elements in the input to defined patterns or values. For example, the correction module can be configured to identify any input beginning with one of a set of defined initial Unicode characters as a corrective input. In the examples of FIGS. 3B and 5A, for instance, the input comprises a string "*there" and "*there/their", and the leading asterisk identifies the string as a corrective input. The correction module 250 may be configured to extract the first character of the received input and compare it to the defined Unicode character identifiers to identify a match. Similarly, if a corrective input is defined as an input set off with leading and trailing characters of a defined type (e.g., "-there-", which includes a leading and trailing "-" character), the correction module 250 would extract the first character and the last character of the input and determine if they matched the defined identifiers for a corrective input. If one or more identifiers are found, the input is determined to be an input for invoking the replacement command.

Next, the correction module 250 identifies one or more operands in the input and stores the one or more operands in device memory. In a simple case, such as FIG. 3B, any content following the identifier is deemed to be an operand; this content is extracted and stored in memory. Similarly, if the input comprises a leading and trailing identifier (as in "-there-"), any content between the two identifiers is the operand. In some implementations, the correction module 250 may extract the first character and compare it against the defined identifiers to find a match; if the match is found, the correction module 250 then scans the remainder of the input to locate a second match with a defined identifier. Any content between the two located identifiers is the operand.

The foregoing examples of identifying and extracting the operand presume that a single operand is contained in the input. When there is a single operand, this operand constitutes the replacement content to be used in updating the previous messages. As will be discussed in further detail with reference to FIG. 7, the input can contain multiple operands, in which case the first operand identifies the original content in the previous messages to be replaced, and the second operand is the replacement content. If the input is formatted like the corrective input of FIG. 5B, after locating the initial identifier, the correction module 250 scans the remainder of the input for a further predefined delimiting character (e.g., "/"). If a delimiting character is found, then the content between the initial identifier and the delimiter is extracted from the input and stored as the original content to be replaced, and the content following the delimiter is extracted from the input and stored as the replacement content.

In the illustrated examples, the content to be identified and replaced in a message constitutes a string of Unicode characters, and thus the operands comprise Unicode character strings. However, in some implementations the input content can include other content, such as graphics (e.g., emoticons), which may not correspond to a Unicode character. The correction module 250 may be configured to carry out similar parsing for other types of content. Further, it will be appreciated by those skilled in the art that the identifiers and delimiters need not be limited to the examples mentioned above.

If the correction module 250 determines at 615 after parsing the input that the input does not contain the appropriate identifier for invoking the replacement operation and/or does at least one operand, the input is deemed to be input for a regular (i.e. not a corrective) message. In that case, the correction module 250 notifies the messaging application 222 that there are no corrections to be made; the messaging application 222 then constructs and sends the input in a message at 620.

If the input is a corrective input with at least one operand, at 625 the correction module 250 identifies at least one previous message in the appropriate message store 212. In some implementations, corrections may only be made to the most recent message sent from the electronic device 100a. In other implementations, more than one message sent from the electronic device 100a may be corrected; for example, all sent messages in the conversation currently displayed in the user interface 300 may be candidates for a correction. The correction module 250 then determines if there are possible corrections to be made to at least one previous message at 630. The module 250 queries the message store 212 for the content of each candidate previous message, and scans each message to determine whether there is any content related to the at least one operand. As discussed above in the example of FIG. 3B to 3F, in some implementations the correction module 250 may identify possible homonyms or homophones of a single operand, and identify any content in each previous message that match a possible homonym or homophone. However, if the corrective input included two operands, then the correction module 250 would instead identify any content in the previous message matching the first operand.

If one or more content portions in previous messages are identified as corresponding to the operand, then the correction module 250 generates and presents an updated user interface view that visually presents the possible corrections to the user, and provides this to the view manager 141 or other process executing on the device 100a for managing application views. The updated user interface view can be similar to the example of FIG. 3C, in which the content portions in the previous messages are visually demarcated and shown with the replacement content, for selection by the user. The updated view can be generated, for example, by overlaying the replacement content over the appropriate content portions of the previous message in the user interface 300. Alternatively, the user interface view generated by the correction module 250 can be similar to the overlay shown in FIG. 5B.

The device 100a then waits for selection input by the user, as described above, at 635-640. When the user has finished selecting content portions for correction, the correction module 250 carries out the replacement operation on the selected content portions at 645, and stores an updated version of the previous messages on which the replacement operation was carried out. The updated messages are then sent to the recipient device 100b via the appropriate communications subsystem 116a-n and messaging infrastructure (e.g., wireless networks, servers, and so forth).

Figure 7:
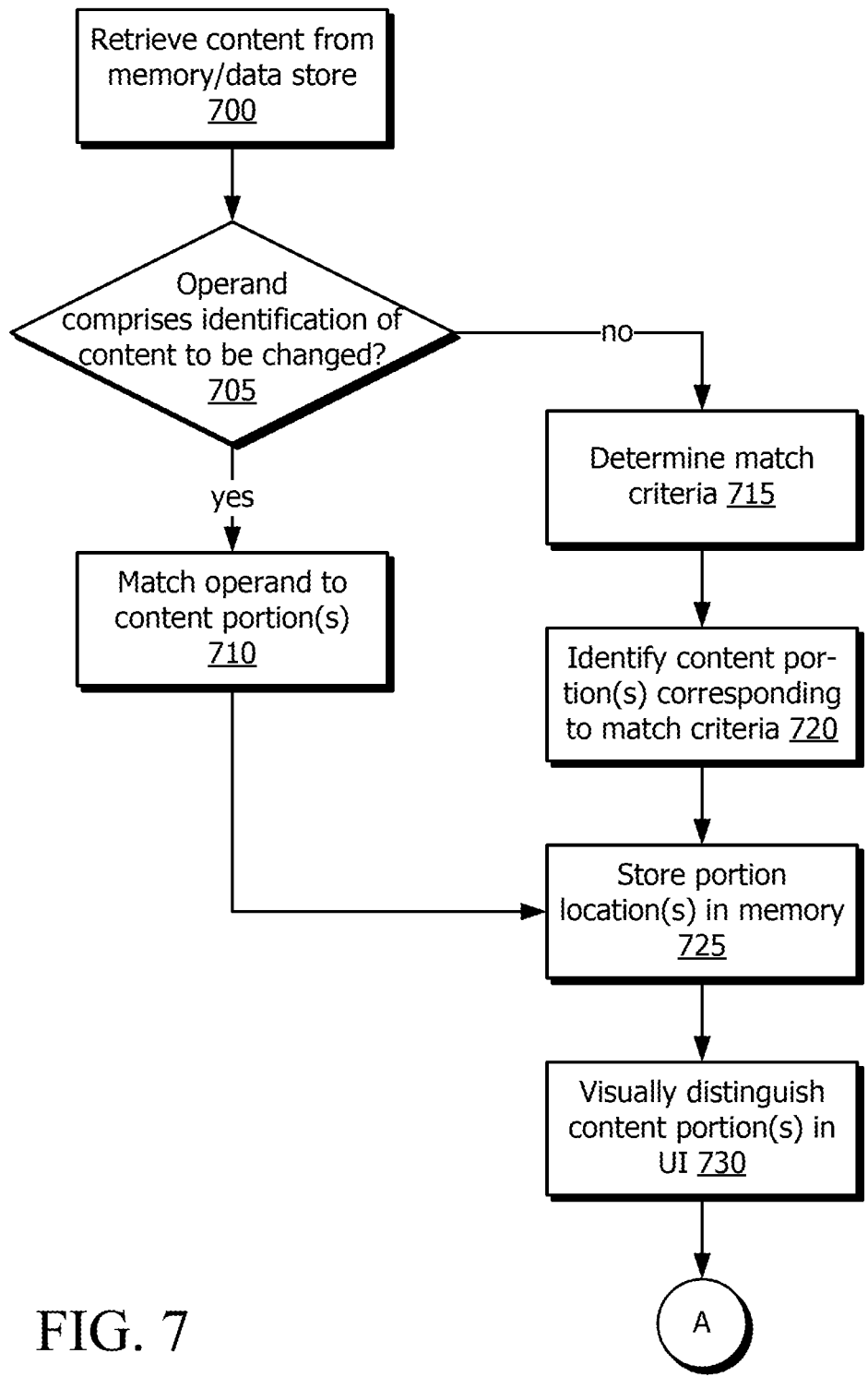
FIG. 7 is a flowchart illustrating a process for identifying message content to be updated.

FIG. 7 is a flowchart providing further detail of the correction module process for determining and displaying possible corrections in candidate messages. At 700, the previous message content is retrieved from the data store 212 or memory of the device 100a. The process used to identify possible corrections depends on the form of the corrective input received by the messaging application 222. At 705, the form of the corrective input is determined, i.e., whether it comprises a specific identification of the original message content to be changed. As described above, when the input includes two operands, the first operand identifies the original message content to be changed, and the second operand is the replacement content. If one of the operands identifies the original message content, then at 710 the correction module 250 locates content portions in the previous messages that match the identified original message content. The locations of those content portions are stored in memory at 725; for example, for each message, the module 250 can store an offset indicating where in the string comprising the message content the matched content portion begins, and optionally store the length of the content portion in the string (although this information can already be determined from the length of the operand).

If, however, it is determined at 705 that the operand included in the input does not identify the original message content to be replaced, the correction module 250 next determines what content in the previous messages may correspond to the operand. This determination comprises first identifying what match criteria may be used at 715, and then identifying content in the previous messages meeting the match criteria at 720. The match criteria may include homonyms or homophones of the operand, as in the example of FIG. 3C. In that case, the correction module 250 queries a lexicon to identify any homonyms or homophones, and identifies content portions in the previous messages on the basis of a match with those homonyms or homophones. The match criteria may include common variations of the operand (e.g., common typographical errors such as omission or transposition of characters, as in "theer" for "there", or "were" for "we're"). Again, the correction module 250 queries a lexicon to identify any such variations, and then identifies content portions in the previous messages on the basis of a match to any of these variations. Alternatively or additionally, the match criteria can include words having the same first two characters as the operand (e.g., words such as "were" and "wet" would correspond to the operand "we're").

Once the matching content portions in the previous messages are identified, their locations (e.g., a character offset from the beginning of the message, and a length of the content portion) can be stored in memory at 725. The correction module 250 then generates a user interface view that visually distinguishes the identified content portions, and provides this view to the view manager 141 for display at 730. This can include visually distinguishing the identified content portions in the messages with a different font decoration or style, and/or can include replacement of the identified content portions with the replacement content, as discussed above.

Figure 8:
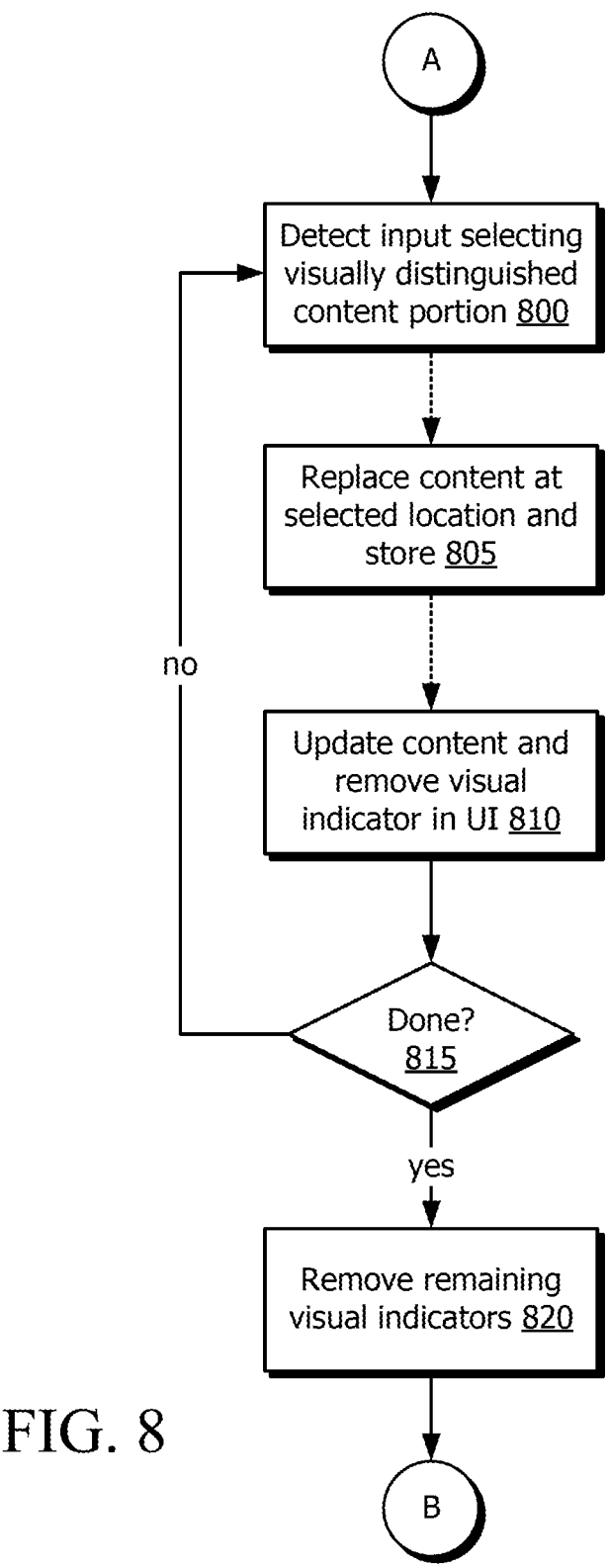
FIG. 8 is a flowchart illustrating a process for updating content on a sending or editing device.
Figure 9:
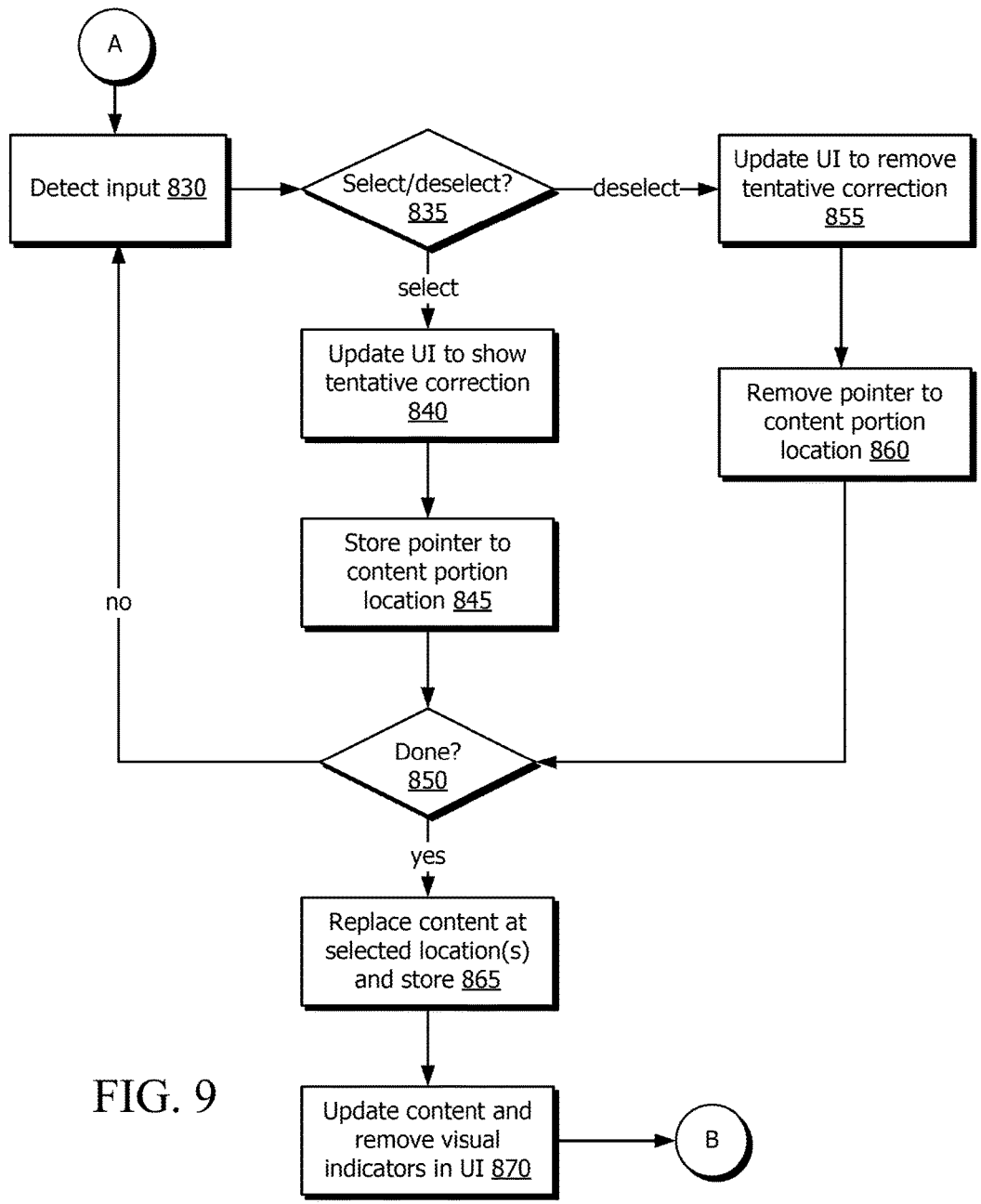
FIG. 9 is a flowchart illustrating a further process for updating content on a sending or editing device.

Once the visually distinguished content portions are displayed in the updated user interface view, the user can select which of the content portions are to be replaced in the updated messages. FIGS. 8 and 9 illustrate different methods for receiving user input and carrying out the replacement operation on the messages. Turning first to FIG. 8, in a simple implementation, the device 100a detects a first input selecting one of the visually distinguished content portions at 800. This selection can occur as illustrated in FIG. 3D and as described above, with a touch action by the user at the location of one of the visually distinguished content portions in the user interface 300. Alternatively, another type of user input mechanism can be used, such as a pointing device (e.g., a mouse or similar device). The location of the touch action is passed to the correction module 250, which identifies the corresponding location of the content portion in the corresponding previous message, and replaces the content portion with replacement content from the corrective input at 805. The correction module 250 then updates the user interface 300 to replace that previously displayed message with the updated message with the replacement, and remove any visual demarcation at that selected location at 810. If the message still includes other content portions that are candidates for replacement, the visual demarcation will still be applied to those content portions.

If it is determined at 815 that there are no further selections of visually distinguished content portions (e.g., by the user actuating the "send" button or a "done" button), then at 820 the remaining visual demarcations are removed from the user interface 300. The process then continues, as described with reference to FIG. 10 below. However, if there are additional user selection inputs detected at 800, the process at 805, 810, 815 repeats until no further selections are received; again, at 820 the remaining visual demarcations are removed, and the process continues as described below. The user interface with visual demarcations thus remains displayed until the user has selected all the desired visually distinguished content portions, which provides continuity to the user, and reduces the resources consumed by the device 100a because all content portions corresponding to the operand are located once, rather than requiring the device 100a to repeatedly search messages to find a next content portion that corresponds to the operand as in some prior art systems.

In another implementation, the user has the option to both select and deselect visually distinguished content to be replaced. Turning to FIG. 9, at 830 the device 100a detects an input at one of the visually distinguished content portions. At 835 it is determined whether the input corresponds to a select or a deselect action. The former occurs when that particular visually distinguished content portion was not previously selected; the latter occurs when the content portion was previously selected. If the input is a select action by the user, at 840 the user interface is updated to show the tentative correction, similar to FIG. 3D above, or in FIGS. 11C and 11D described below. The content portion of the previous message is replaced in the user interface with the replacement content provided by the corrective input, and is preferably visually demarcated not only from the surrounding message context, but also from the other, unselected, visually distinguished content portions to show that this particular content portion has been selected. For example, content that is visually demarcated in step 730 above may have a first font decoration or style (e.g., highlighted in a first color); once it is selected at step 830, the visual demarcation at 840 changes to a second font decoration or style (e.g., highlighted in a second color). At 845, the location of the selected content portion is stored in memory as a content portion location to be replaced during execution of the replacement operation. The location may be stored as a pointer to another address in memory that already stores the content portion location in the previous message; as explained above, the content portion locations may have already been stored at step 725.

If the user input at 830 is a deselection—that is, if the user is selecting the same visually distinguished content portion a second time—then at 855 the user interface is updated to remove the tentative correction. This removal may remove all special font decorations or styles, so that the content portion is formatted like the surrounding message content, as well as remove any display of the replacement content in place of the content portion in the user interface, if this occurred (as in FIG. 3D). Since the location of or a pointer to the deselected content portion would have been previously stored in memory at 845, this location or pointer is deleted or overwritten in the memory at 860.

Once it is determined that all user selection/deselection inputs are complete at 850, the correction module 250 then updates the message content in the previous messages as required, and updates the user interface to remove any visual demarcations previously displayed at 870. To update the message content, the correction module 250 uses the stored locations or pointers from step 845 to locate the content portions in the previous messages to be replaced, and replaces the located content portions with the replacement content from the corrective input. The previous messages, thus changed, are stored in memory. The correction module 250 can then notify the messaging application 222 of the updated messages.

Figure 10:
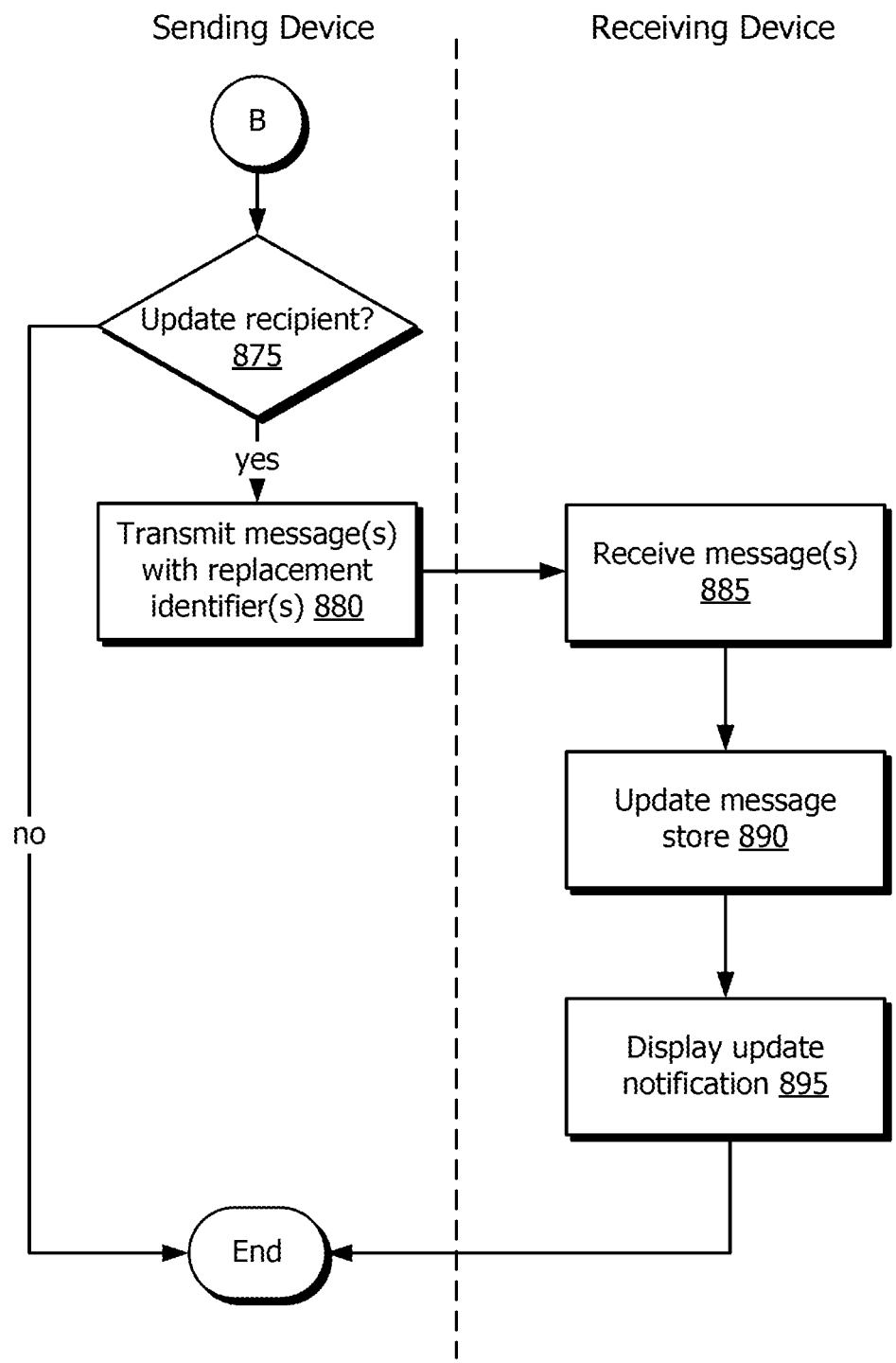
FIG. 10 is a flowchart illustrating a process for updating a message on a recipient device.

Turning to FIG. 10, it is then determined whether the updated message is to be transmitted to a recipient as an update message at 875. This determination can be carried out by the messaging application 222 that invoked the correction module's functions as described FIGS. 6 to 8 above, after receiving the notification from the correction module 250. At 880, the messaging application 222 then transmits the updated previous messages to the recipient device 100b over a suitable messaging infrastructure using one of the communication subsystems 116a-n. The updated previous messages optionally include with replacement identifiers. A replacement identifier can be comprised in a message header identifying the updated message as a replacement to an identified earlier message. In some implementations, the updated message can include formatting identifying the replacement content; for example, if the message contains markup notation, the replacement content can be set off between <span id="[replacement]"></span> tags, or some other suitable notation indicating that the content is to be formatted differently when the message is rendered and presented at the recipient device 100b. Thus, once the updated message is received by the recipient device 100b at step 885 and stored in its message store at 890, the updated message can be displayed to the user of the recipient device at 895 with visually demarcating formatting applied to the replacement content, which is identifiable by the tags. Depending on the configuration of the receiving messaging application 222 on the recipient device 100b, the updated message can be displayed in place of the previously received message. The updated message may be visually distinguished, in its entirety, as a replacement message (e.g., the background of the message text may be a different color than the other messages). Alternatively, the recipient device 100b can simply display the updated messages in an overlay.

As noted earlier, while the corrective module 250 carrying out the various steps described above may be a distinct module from the messaging or other applications on the device 100a, in some implementations the corrective module's functions can be incorporated into the messaging application itself; thus, all functions described as being carried out by the corrective module 250 would be carried out by the messaging application 222. In alternative implementations, the messaging application 222 may carry out the parsing of the corrective input (as in step 610 of FIG. 6) and identify the operands in the input, and pass these operands to the corrective module 250, which carries out the processes of FIGS. 7 and 8.

Figure 11H:
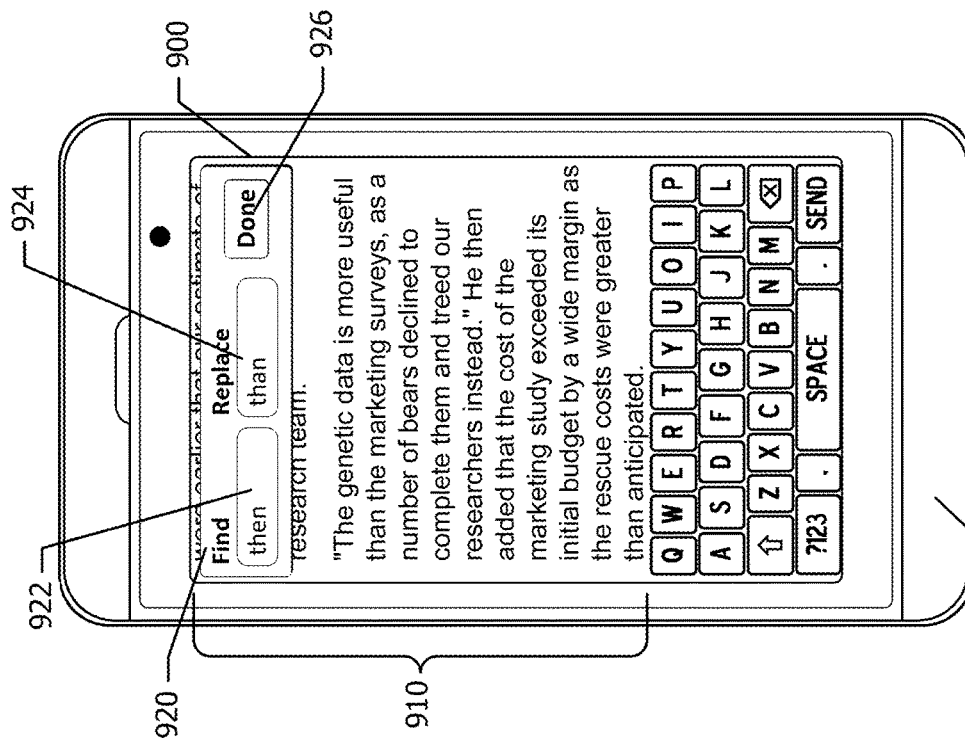

FIGS. 11A to 11H illustrate example user interfaces 900 implementing the method of FIG. 9 in the context of text editing, rather than in a messaging context. FIG. 11A shows an initial state of a text editing application user interface 900, which includes a field of text for editing on the device 100a. A find-and-replace function can be invoked from the application to locate particular strings of text in the field 910 and replace them with another string. FIG. 11B illustrates an example user interface 920 for this function; this find-and-replace user interface 920 includes a first input field in which the user can enter the original text string to be located in the text field 910, a second input field 924 in which the user can input a replacement string, and a "done" button or other user interface element 926 that can be actuated by the user to indicate completion of a find-and-replace task. In this example, the original string is the word "then" and the replacement string is the word "than"; the text visible in the text field 910 includes one occurrence of "then", which in FIG. 11B has been visually demarcated at 912 in a manner similar to the earlier examples. This demarcation includes replacement of the original string with the replacement string, so that the possible correction can be seen inline in the text, in context.

On determination that the correction is to be made to that word, the user can select the visually demarcated string 912, for example by a touch input as described above, indicated by oval C in FIG. 11C. The string 912 can then change in appearance as described above to indicate that it has been selected, as shown. However, this may not be the only instance of a visually demarcated string in the text field 910; in this case, due to the small size of the device 100a's screen, the user may need to scroll to see other instances, as indicated by ovals and arrows D and E (indicating scrolling touch gestures) in FIGS. 11C and 11D. As can be seen in FIGS. 11D and 11E, additional visually demarcated strings 914, 916, and 918 are also present in the text field 910. The user can select additional visually demarcated strings in the field 910, such as strings 916 and 918, as indicated by ovals F and G in FIGS. 11E and F. Again, as described above, the strings 916 and 918 change in appearance to indicate their selection by the user during this find-and-replace task.

Figure 11G:
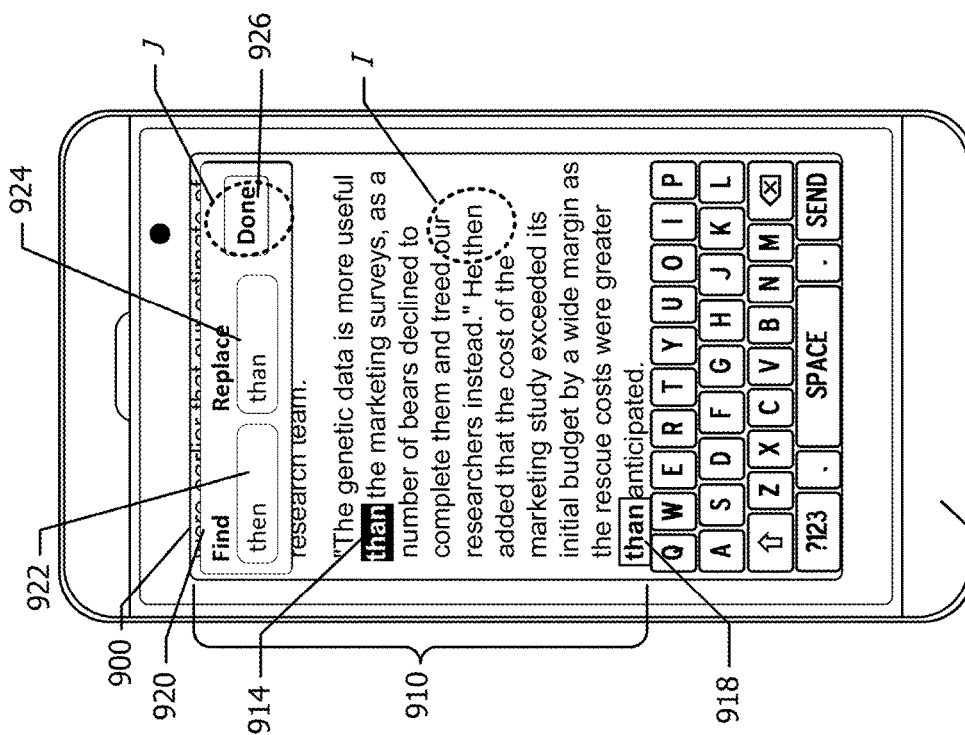

However, if is then determined that one or more of these selected strings 912, 916, 918 should be deselected—that is to say, it is determined that the replacement string is not to be applied to the original string at that location—then the string can be deselected. Turning to FIG. 11G, a second touch on the location of the visually demarcated string 916, as indicated by oval I, is detected by the device 100a and results in removal of the visual demarcation on the original word "then", including the display of the replacement string; in other words, the string 916, when deselected, is returned to its original state in the text. Once all selection and deselection is completed by the user, the user can indicate completion by actuating the "done" button 926 (as indicated by oval J) in this touchscreen example), in response to which the device 100a executes the replacement operation on all of the selected strings in the text, as described above with reference to FIG. 9 in the context of messaging. The final state of the text in the text field 910 is shown in FIG. 11H.

This process of selection and deselection of strings or content portions within text or message content in a single pass by the user reduces the consumption of resources at the device 100a. In some prior art systems, a find-and-replace process is executed on a word-by-word or string-by-string basis: the device searches for the first instance of the original string to be replaced in the text; when found, the user is presented with an option to apply or not apply the replacement string; the original string is then updated with the replacement as the case may be, and then the device must search again for the next instance, present the option, and so on until all of the text has been searched. While these prior art systems also provide the user with an option to "undo" or reverse a recent change, these undo actions are executed in chronological order; the user must first reverse the last replacement before the previous replacement can be reversed, even if the user did not wish to reverse the last replacement, or alternatively, must commit to reversing all replacements in the text, and not just one. In other words, with reference to FIG. 11G, the user would have had to reverse the change to string 918 before reversing the change to string 916, or reverse the changes to all of strings 912, 916, and 918, and not just string 916. The present solution, however, permits the user to not only select strings to be replaced out of order within the text, but also to deselect strings in still a different order than the order (or reverse order) in which the strings were previously selected.

Thus, there is provided a method implemented by an electronic device comprising a touchscreen display, the method comprising receiving user input in an input field of a messaging application; determining that the user input comprises an indicator for a replacement operation and at least one operand; in response to the determining, identifying multiple strings corresponding to the at least one operand in at least one previous message sent by the messaging application; presenting a user interface in the touchscreen display in which the identified strings are displayed in context in the at least one previous message in a visually distinguished manner; detecting, using the touchscreen display, a touch input on each of a plurality of the visually distinguished strings in the user interface, each touch input selecting the visually distinguished string at the touch input location; carrying out a replacement operation on each of the selected visually distinguished strings using the at least one operand to provide at least one updated previous message; and sending the at least one updated previous message to a recipient of the at least one previous message.

In one aspect, the indicator for the replacement operation comprises a character token and the at least one operand comprises a replacement string, and identifying the multiple strings corresponding to the at least one operand comprises determining at least one match criterion for the replacement string, and identifying strings in the at least one previous message corresponding to the match criterion.

In another aspect, the indicator for the replacement operation comprises at least one character token and the at least one operand comprises an original string and a replacement string, and identifying the multiple strings corresponding to the at least one operand comprises identifying strings in the at least one previous message matching the original string.

Still further, displaying the identified strings in a visually distinguished manner can comprise replacing each identified string with a replacement string comprised in the at least one operand, and visually demarcating the replacement string from surrounding content, and further comprising, as each touch input is detected, removing the visual demarcation from the selected visually distinguished string; and carrying out the replacement operation can comprise updating a stored copy of the at least one previous message to replace the identified string corresponding to the selected visually distinguished string with the replacement string.

In a further aspect, carrying out the replacement operation comprises: as each touch input on a visually distinguished string is detected, storing an indicator of the location of the corresponding identified string in the at least one previous message in memory of the electronic device; when a second touch input on a previously selected visually distinguished string is detected, removing the indicator of the location of the corresponding identified string from the memory; and for each stored indicator, replacing the corresponding identified string with a replacement string comprised in the at least one operand in a copy of the at least one previous message to thereby provide the at least one updated previous message.

The user interface can comprise a conversation history view of the messaging application, and the at least one previous message comprises only those messages currently visible in the conversation history view.

There is also provided a method implemented by an electronic device comprising a display for carrying out a replacement operation on content displayed in the device, the method comprising receiving user input defining an original content portion to be replaced and a replacement content portion; identifying multiple portions corresponding to the original content portion in the content; presenting a user interface in which the identified portions are displayed in context in the displayed content in a visually distinguished manner; detecting a user input located at each of a plurality of the visually distinguished portions in the user interface, thereby selecting those portions; and carrying out a replacement operation on each of the selected visually distinguished portions using the replacement content portion.

There is also provided an electronic device comprising suitable memory, processors, and display interfaces configured to implement the above-described methods, and a computer-readable medium, which may be physical or non-transitory, storing code, which when executed by a suitable electronic device, causes the device to implement the above-described methods.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments. While the foregoing examples were described and illustrated with reference to a handheld mobile device with a touchscreen interface, they may be implemented with suitable modification on a computing device with a larger display screen or without a touchscreen interface. Where a touchscreen interface is not employed, user input via the graphical user interface may be received from a pointing device and/or a keyboard. Further, while these examples have been illustrated in the context of a full-screen application, where the various user interface views fill an entirety of the available screen space allocated to application views, these examples may be modified for use in an environment in which applications are displayed only in a window or portion of the screen (i.e., not occupying the entire display screen).

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. The language of this disclosure should not be construed as a commitment to a "promise" to be fulfilled by the invention(s). Any suggestion of substitutability of the electronic device for other implementation means should not be construed as an admission that the invention(s) described herein are abstract, or that the electronic device or its components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A method implemented by an electronic device comprising a touchscreen display, the method comprising:

displaying a conversation view of a messaging application on a touchscreen display of an electronic device, the conversation view comprising a message history pane displaying a plurality of previous messages sent from the electronic device at different times in a conversation and an input field for receiving input content for inclusion in a message;

receiving user input in the input field;

determining, using a microprocessor of the electronic device, that the user input comprises at least one character signifying a replacement operation and an operand;

in response to the determining, identifying using the microprocessor multiple strings corresponding to the operand in a plurality of previous messages sent by the messaging application;

identifying, in the message history pane, the identified strings, wherein the identified strings are displayed in context in the plurality of previous messages in a visually distinguished manner;

detecting, using the touchscreen display, a touch input on at least one visually distinguished string in the user interface, each touch input selecting the visually distinguished string at the touch input location;

carrying out a replacement operation using the microprocessor on each of the selected at least one visually distinguished string using the operand to provide at least one updated previous message; and sending the at least one updated previous message to a recipient of the at least one previous message.

2. The method of claim 1, wherein the operand comprises a replacement string, and identifying the multiple strings corresponding to the operand comprises determining at least one match criterion for the replacement string, and identifying strings in the plurality of previous messages corresponding to the at least one match criterion.

3. The method of claim 1, wherein the operand comprises an original string and a replacement string, and identifying the multiple strings corresponding to the operand comprises identifying strings in the plurality of previous messages matching the original string.

4. The method of claim 1, wherein displaying the identified strings in a visually distinguished manner comprises replacing each identified string with a replacement string comprised in the operand, and visually demarcating the replacement string from surrounding content, and further comprising, as each touch input is detected, removing the visual demarcation from the selected visually distinguished string;

and wherein carrying out the replacement operation comprises updating a stored copy of the previous message comprising the selected visually distinguished string to replace the identified string corresponding to the selected visually distinguished string with the replacement string.

5. The method of claim 1, wherein carrying out the replacement operation comprises:

as each touch input on a visually distinguished string is detected, storing an indicator of the location of the corresponding identified string in the previous message comprising the selected visually distinguished string in memory of the electronic device;

when a second touch input on a previously selected visually distinguished string is detected, removing the indicator of the location of the corresponding identified string from the memory; and for each stored indicator, replacing the corresponding identified string with a replacement string comprised in the operand in a copy of the previous message comprising the selected visually distinguished string to thereby provide the at least one updated previous message.

6. An electronic device, comprising:
a touchscreen display;
at least one memory device;
at least one communications subsystem; and
at least one processor, the at least one processor being configured to:
display a conversation view of a messaging application on a touchscreen display of an electronic device, the conversation view comprising a message history pane displaying a plurality of previous messages sent from the electronic device at different times in a conversation and an input field for receiving input content for inclusion in a message;
receive user input in the input field;
determine that the user input comprises at least one character signifying a replacement operation and an operand;
in response to the determining, identify multiple strings corresponding to the operand in at least one previous message sent by the messaging application;

identify, in the message history pane, the identified strings, wherein the identified strings are displayed in context in the at least one previous message in a visually distinguished manner;

detect, using the touchscreen display, a touch input on each of a plurality of the visually distinguished strings in the user interface, each touch input selecting the visually distinguished string at the touch input location;

carry out a replacement operation on each of the selected visually distinguished strings using the operand to provide at least one updated previous message; and send the at least one updated previous message to a recipient of the at least one previous message.

7. The electronic device of claim 6, wherein the operand comprises a replacement string, and identifying the multiple strings corresponding to the operand comprises determining at least one match criterion for the replacement string, and identifying strings in the at least one previous message corresponding to the match criterion.

8. The electronic device of claim 6, wherein the operand comprises an original string and a replacement string, and identifying the multiple strings corresponding to the operand comprises identifying strings in the at least one previous message matching the original string.

9. The electronic device of claim 6, wherein displaying the identified strings in a visually distinguished manner comprises replacing each identified string with a replacement string comprised in the operand, and visually demarcating the replacement string from surrounding content, and further comprising, as each touch input is detected, removing the visual demarcation from the selected visually distinguished string;

and wherein carrying out the replacement operation comprises updating a stored copy of the at least one previous message to replace the identified string corresponding to the selected visually distinguished string with the replacement string.

10. The electronic device of claim 6, wherein carrying out the replacement operation comprises:

as each touch input on a visually distinguished string is detected, storing an indicator of the location of the corresponding identified string in the at least one previous message in memory of the electronic device;

when a second touch input on a previously selected visually distinguished string is detected, removing the indicator of the location of the corresponding identified string from the memory; and for each stored indicator, replacing the corresponding identified string with a replacement string comprised in the operand in a copy of the at least one previous message to thereby provide the at least one updated previous message.

11. A non-transitory computer-readable medium storing code which, when executed by at least one processor of an electronic device comprising a touchscreen display, causes the electronic device to implement:

displaying a conversation view of a messaging application on a touchscreen display of an electronic device, the conversation view comprising a message history pane displaying a plurality of previous messages sent from the electronic device at different times in a conversation and an input field for receiving input content for inclusion in a message;

receiving user input in the input field;

determining that the user input comprises at least one character signifying a replacement operation and an operand;

in response to the determining, identifying multiple strings corresponding to the operand in at least one previous message sent by the messaging application;

identifying, in the message history pane, the identified strings, wherein the identified strings are displayed in context in the at least one previous message in a visually distinguished manner;

detecting, using the touchscreen display, a touch input on each of a plurality of the visually distinguished strings in the user interface, each touch input selecting the visually distinguished string at the touch input location;

carrying out a replacement operation on each of the selected visually distinguished strings using the operand to provide at least one updated previous message; and sending the at least one updated previous message to a recipient of the at least one previous message.

12. The non-transitory computer-readable medium of claim 11, wherein the operand comprises a replacement string, and identifying the multiple strings corresponding to the operand comprises determining at least one match criterion for the replacement string, and identifying strings in the at least one previous message corresponding to the match criterion.

13. The non-transitory computer-readable medium of claim 11, wherein the operand comprises an original string and a replacement string, and identifying the multiple strings corresponding to the operand comprises identifying strings in the at least one previous message matching the original string.

14. The non-transitory computer-readable medium of claim 11, wherein displaying the identified strings in a visually distinguished manner comprises replacing each identified string with a replacement string comprised in the operand, and visually demarcating the replacement string from surrounding content, and further comprising, as each touch input is detected, removing the visual demarcation from the selected visually distinguished string;

and wherein carrying out the replacement operation comprises updating a stored copy of the at least one previous message to replace the identified string corresponding to the selected visually distinguished string with the replacement string.

15. The non-transitory computer-readable medium of claim 11, wherein carrying out the replacement operation comprises:

as each touch input on a visually distinguished string is detected, storing an indicator of the location of the corresponding identified string in the at least one previous message in memory of the electronic device;

when a second touch input on a previously selected visually distinguished string is detected, removing the indicator of the location of the corresponding identified string from the memory; and for each stored indicator, replacing the corresponding identified string with a replacement string comprised in the operand in a copy of the at least one previous message to thereby provide the at least one updated previous message.

16. The non-transitory computer-readable medium of claim 11, wherein the electronic device is further caused to implement:

receiving, displaying, and storing a first message from a second electronic device;

receiving an updated message from the second electronic device;

replacing the stored first message with the updated message; and displaying a notification that the first message was updated.

\* \* \* \* \*